United States Patent [19]

Ito et al.

[11] Patent Number: 5,065,455
[45] Date of Patent: Nov. 12, 1991

[54] OPTICAL ATMOSPHERIC LINK SYSTEM

[75] Inventors: Yujiro Ito; Koji Suzuki; Satoshi Kusaka, all of Kanagawa, Japan

[73] Assignee: Sony Corporation, Tokyo, Japan

[21] Appl. No.: 352,554

[22] Filed: May 16, 1989

[30] Foreign Application Priority Data

May 20, 1988 [JP] Japan .................. 63-123543

[51] Int. Cl.$^5$ .......................................... H04B 10/22
[52] U.S. Cl. ................................................. 359/1.59
[58] Field of Search ............... 455/600, 603, 606, 607, 455/617; 370/1, 3, 4

[56] References Cited

U.S. PATENT DOCUMENTS

| | | | |
|---|---|---|---|
| 3,504,182 | 3/1970 | Pizzurro | 455/607 |
| 3,511,998 | 5/1970 | Smokler | 455/606 |
| 3,566,126 | 2/1971 | Lang | 455/607 |
| 4,867,560 | 9/1989 | Kunitsugu | 455/607 |

OTHER PUBLICATIONS

Auer, "Pointing, Aquisition and Tracking for Intersatellite Optical Data Links", Proc. ESA Workshop on Space Laser Applications and Technology, Les Diablerets, Mar. 26-30, 1984.

Primary Examiner—Reinhard J. Eisenzopf
Assistant Examiner—L. Pascal
Attorney, Agent, or Firm—Philip M. Shaw, Jr.

[57] ABSTRACT

In an optical atmospheric link system for transmitting a light beam carrying an information signal between a transmitter and a receiver which is located apart from the transmitter, the transmitter includes a light source for generating the first light beam modulated with the information signal, a first optical system for transmitting the light beam toward the receiver, a second optical system for turning at least a portion of the light beam, and a third optical system for observing the light beam turned by the second optical system and the receiver. Also, the receiver includes a first detector for receiving the first light beam transmitted from the transmitter through the first optical system, detecting a relative position of the first light beam received and the receiver and for generating a position error signal, a second light source for generating a second light beam modulated with the position error signal, and a second optical system for transmitting the second light beam generated by the second light source toward the transmitter, wherein the transmitter further includes a second detector for receiving the second light beam transmitted from the receiver through the second optical system and demodulating the second light beam to obtain the position error signal, and a position control circuit for controlling a position of the transmitter according to the position error signal obtained by the second detector so that the light beam is directed toward the receiver.

9 Claims, 15 Drawing Sheets

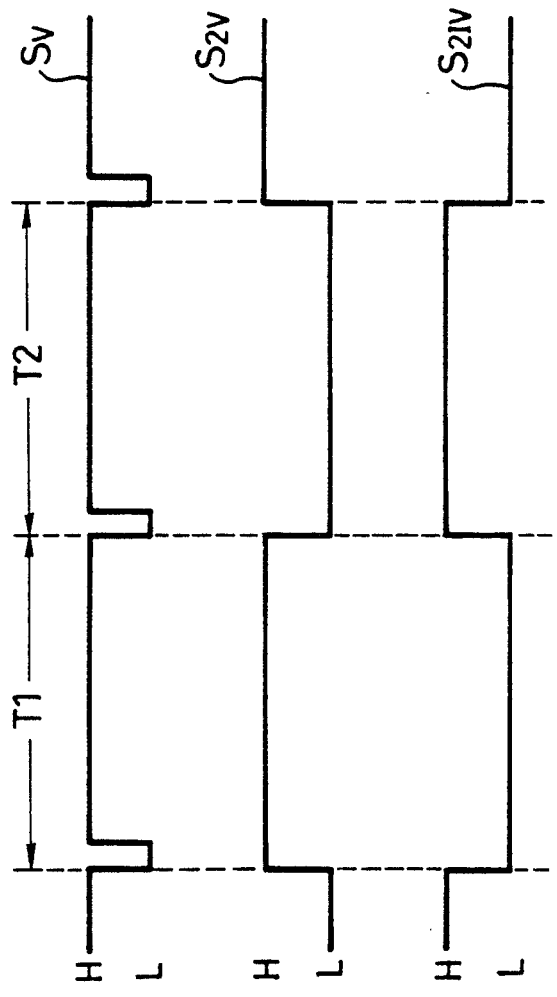
FIG. 10A
FIG. 10B
FIG. 10C
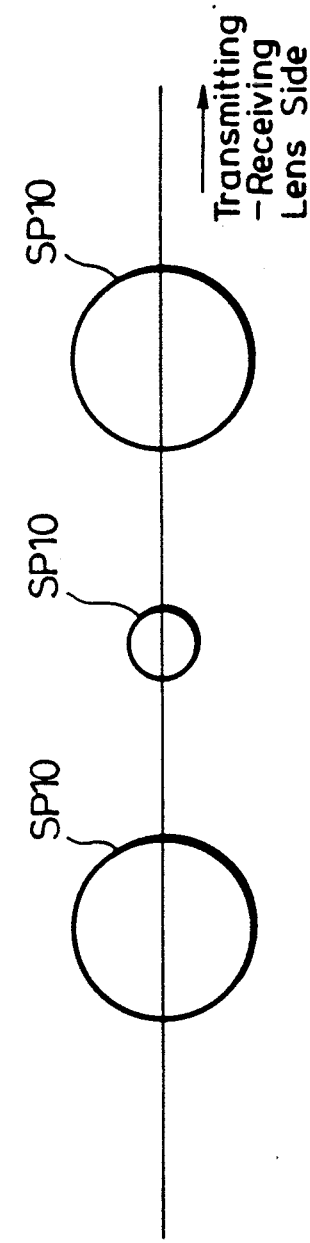
FIG. 11

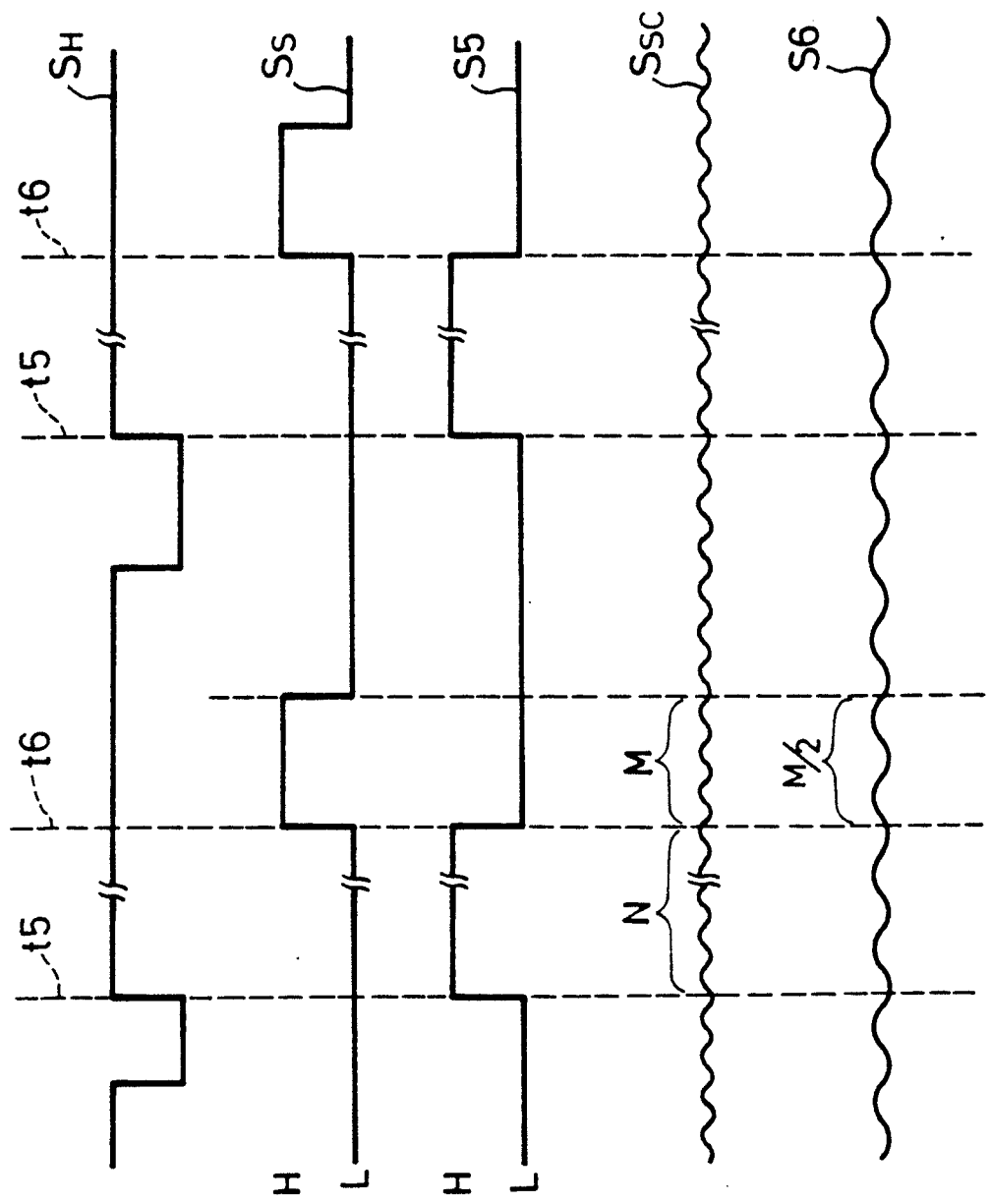

OPTICAL ATMOSPHERIC LINK SYSTEM

BACKGROUND OF THE INVENTION

1. Field of the Invention

The present invention relates generally to an optical atmospheric link system and, more particularly, to an optical atmospheric link system which can transmit data by using light beam transmitted in a bidirectional fashion.

2. Description of the Prior Art

This kind of optical atmospheric link system transmits data by utilizing light beams transmitted in space. According to the prior-art optical atmospheric link system, transmitter-receiver apparatus are installed on the rooftops of buildings which are apart from each other by several kilometers. Then, the azimuth angles of the light beam to be emitted are adjusted so that the light beams emitted from the transmitter-apparatus irradiate the light receiving portions of the receiving apparatus. Thus, the data can be transmitted between the buildings provided with the transmitter-receiver apparatus respectively.

According to the optical atmospheric link system, the transmitter-receiver systems need not be connected to each other via a special network line such as an optical fiber and the like. Hence, data can be transmitted easily.

Further, light beams having sharp directivity can be obtained by the simplified arrangement so that as compared with the system utilizing millimetric waves, microwaves or the like, the optical atmospheric link system can transmit data in the highly-scrambled state.

In this kind of optical atmospheric link system, however, it is difficult for the transmitter side to detect the right place to be irradiated with the emitted light beam. The problem is then presented that the azimuth angle at which the light beam is emitted from the transmitter has to be precisely adjusted, which provides a lot of cumbersome work.

In order to precisely detect the position irradiated with the light beam, a wall is provided at a receiver side and the position of a light spot formed on this wall is detected.

This proposal is not powerful because the amount of the light which is reflected on the wall and then returns to the transmitter side is very small. Therefore, even in the night, in particular, in which the amount of external light is very small, it is frequently observed that the position to be irradiated with the light beam cannot be detected without difficulty.

According to the above-mentioned proposal, the position of the light spot formed on the wall of the receiver side has to be repeatedly detected and the azimuth angle of the emitted light beam has to be repeatedly adjusted on the basis of the detected results transmitted to the transmitter side, which also provides a cumbersome work.

Further, it is impossible to form a large wall on the receiver side on the rooftop of the building or the like, which makes the adjustment of the azimuth angle of the light beam to be emitted impossible.

A proposal for solving the above-mentioned problems is made, wherein the azimuth angle of the light beam to be emitted is adjusted by a sighting device formed of a telescope provided in the transmitter side. In other words, if the optical axis of light beam transmitted from the transmitter and the optical axis of the sighting device are previously adjusted so as to become coincident with each other, then the azimuth angle of the light beam to be emitted is adjusted such that the light beam may irradiate the light receiving surface of the receiver.

According to the above proposal, the optical axis of the light beam and optical axis of the sighting device have to be previously adjusted to be coincident to each other with high accuracy, which provides a cumbersome adjustment. For this reason, the above-mentioned proposal can only coarsely adjust the azimuth angle of the emitted light beam. Consequently, the position of the light spot has to be repeatedly detected on the receiver side and the azimuth angle of the light beam to be emitted has to be adjusted on the basis of the detected results transmitted to the transmitter.

When a light beam having sharp directivity is employed, then the azimuth angle of the light beam to be emitted has to be adjusted with high accuracy, which situation provides more complicated adjustment.

Further, when the optical axis of the light beam emitted from the transmitter side and the optical axis of the sighting device are adjusted to be coincident to each other as described above, an error signal therebetween has to be transmitted to the transmitter side. Thus, a network line for transmitting the position error signal becomes necessary. In this case, if a special network line such as a telephone network line or the like is used, the telephone network line or the like must be provided between the transmitter-receiver apparatus. This, causes the overall arrangement of the optical atmospheric link system to become complicated. This removes the merit of the optical atmospheric link system so that data cannot be transmitted between the transmitter-receiver systems just installed on the rooftops of the buildings with ease.

To solve the above-mentioned problem, it is proposed as one method that a light beam be emitted from the receiver side to the transmitter side to effect the transmission of the position error signal.

The above proposal additionally needs a transmitting apparatus for emitting the light beam from the receiver side to the transmitter side, a light modulating apparatus for modulating the light beam by the position error signal, a demodulating apparatus for demodulating the modulated light beam and so on, which complicates the overall arrangement of the optical atmospheric link system.

When the optical axis adjustment is made by constantly effecting a servo operation, then a light beam irradiating apparatus has to be constantly operated on the receiver side to transmit the position error signal therefrom to the transmitter side.

In order for the receiver side to obtain the position error signal when the optical atmospheric link system is installed, the light beam emitted from the transmitter system must be widened to some extent, which increases the amount of the light beam.

Further, when the focus of the light beam is adjusted, then the properly-focused state of the light beam is repeatedly detected on the receiver side, following which the light beam is adjusted in its widening on the basis of the detected results. This focus adjustment is rather cumbersome.

OBJECTS AND SUMMARY OF THE INVENTION

It is an object of the present invention to provide an optical atmospheric link system which can solve the above-mentioned problems inherent in the prior art.

More specifically, it is an object of the present invention to provide an optical atmospheric link system which can detect a position irradiated with a light beam transmitted from a transmitter side with ease.

It is another object of the present invention to provide an optical atmospheric link side which can detect a position irradiated with a light beam transmitted from a transmitter without connecting the transmitter side and the receiver side via a new communication line.

It is still another object of the present invention to provide an optical atmospheric link system which can automatically adjust the positioning of a light beam transmitted from a transmitter side to a receiver side.

It is a further object of the present invention to provide an optical atmospheric link system which can automatically adjust the positioning of a light beam transmitted from a transmitter side to a receiver side by utilizing a two-step servo system of a coarse adjusting servo system and a fine adjusting servo system.

It is still a further object of the present invention to provide an optical atmospheric link system which automatically adjusts the relative distance between a light transmitting lens and a light source so that the widening of a light beam transmitted from the transmitter system side is properly controlled.

In accordance with an aspect of the present invention, there is provided an optical atmospheric link system for transmitting a light beam carrying an information signal between a transmitter means and a receiver means which is located apart from said transmitter means, said transmitter means comprising:

light source means for generating said light beam modulated with said information signal;

first optical system means for transmitting said light beam from said light source means toward said receiver means;

second optical system means for turning at least a portion of said light beam; and third optical system means for observing said light beam turned by said second optical system means and said receiver means.

In accordance with another aspect of the present invention, there is provided an optical atmospheric link system for transmitting a light beam carrying an information signal between a transmitter means and a receiver means which is located apart from said transmitter means, said transmitter means comprising:

first light source means for generating a first light beam;

first optical system means for transmitting said first light beam generated from said first light source means; and said receiver means comprising:

first detector means for receiving said first light beam transmitted from said transmitter mean through said first optical system means, detecting the relative position of said first light beam received and said receiver means and for generating a position error signal;

second light source means for generating a second light beam modulated with said position error signal generated by said first detector means; and second optical system means for transmitting said second light beam generated by said second light source means toward said transmitter means, wherein said transmitter means further comprises:

second detector means for receiving said second light beam transmitted from said receiver means through said second optical system means and demodulating said second light beam to obtain said position error signal; and position control means for controlling the position of said transmitter means according to said position error signal obtained by said second detector means so that said light beam is directed toward said receiver means.

The above, and other objects, features and advantages of the present invention will be apparent in the following detailed description of preferred embodiments of the invention when read in conjunction with the accompanying drawings, in which the same reference numerals identify corresponding parts in the several views.

BRIEF DESCRIPTION OF THE DRAWINGS

FIGS. 10A, 10B and 10C are respectively waveform diagrams to which reference will be made in explaining the operation of the light beam focus adjustment system shown in FIG. 9;

FIG. 11 is a schematic diagram used to explain how the spot width of a light spot is changed with the position movement of a laser light source relative to a transmitting-receiving common lens;

FIGS. 17A, 17B, 17C, 17D and 17E are waveform diagrams used to explain the operation of the azimuth adjusting circuit of the invention shown in FIG. 14;

DETAILED DESCRIPTION OF PREFERRED EMBODIMENTS

The present invention will hereinafter be described in detail with reference to the attached drawings.

Figure 1:
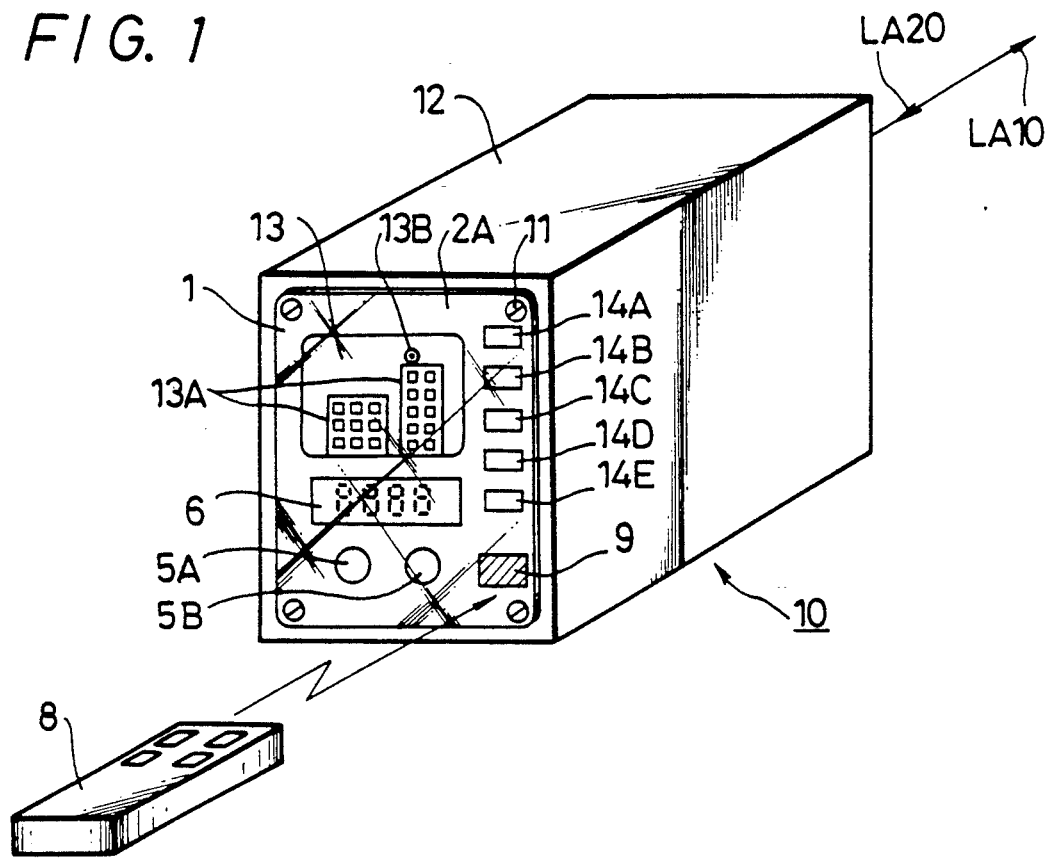
FIG. 1 is a perspective view pictorially illustrating an embodiment of a transmitter-receiver apparatus of an optical atmospheric link system according to the present invention.

A perspective view forming FIG. 1 illustrates a first embodiment of optical atmospheric link system of the invention. In FIG. 1, reference numeral 10 generally designates a first transmitter-receiver apparatus. The first transmitter-receiver apparatus 10 will be hereinunder referred to as a main transmitter-receiver apparatus. The main transmitter-receiver apparatus 10 is incorporated within a housing 12 and is installed, for example, on the rooftop of a building to transmit a light beam LA10 carrying an information signal to a second transmitter-receiver apparatus and also to receive a light beam LA20 carrying an information signal transmitted from the second transmitter-receiver apparatus. The second transmitter-receiver apparatus is constructed substantially the same as the first transmitter-receiver apparatus 10, though not shown. This second transmitter-receiver apparatus will be hereinunder referred to as a target transmitter-receiver apparatus.

As shown in FIG. 1, the housing 12 of the main transmitter-receiver apparatus 10 has an operation panel 2A attached to its front wall. On the operation panel 2A, there are provided switches 14A, 14B, 14C and 14D and buttons 5A and 5B.

The switch 14A is used to change the picture displayed on a screen of a monitor or display apparatus 13, the switch 14B is used to power the main transmitter-receiver apparatus 10, the switches 14C and 14D are used to match the optical axes in the horizontal and vertical directions, and the switch 14E is used to adjust the focus point. The buttons 5A and 5B are used to adjust the gain so that the optical axes in the horizontal and vertical direction are adjusted by the servo-control operation. Further, a display portion 6 is provided on the front panel 2A to display the position irradiated with the light beam and the like.

A receiving portion 9 is mounted on the operation panel 2A in order to receive a remote control signal transmitted from a remote commander 8. Thus, without operating the switch 14A to the button 5B directly, the main transmitter-receiver apparatus 10 can be remotely controlled by using the remote commander 8.

A transparent panel cover 1 is attached to the operation panel 2A by screws 11 so as to cover the monitor apparatus 13, the switch 14A to the button 5B and the display portion 6. When the transparent panel cover 1 is attached, the switch 14A to the button 5B can not be operated directly. Thus, when the main transmitter-receiver apparatus 10 is installed, it is remotely controlled by the remote commander 8.

The transmitter-receiver apparatus 10 is designed to transmit the light beam LA10 to a target apparatus which is located very far apart from the transmitter apparatus. Accordingly, even if a very slight shock is applied to the main transmitter-receiver apparatus 10, the irradiation position of the optical beam LA10 is fluctuated considerably. There is then a risk that the optical axis of the light beam LA10 will be fluctuated if the user touches the switch 14A to the button 5B on the operation panel 2A upon adjustment. To solve the above-mentioned problem, according to this embodiment, the switch 14A to the button 5B on the operation panel 2A are not directly operated but they are remotely controlled by the remote commander 8, which proposal can effectively protect the main transmitter-receiver apparatus 10 from being shocked.

Further, the transparent panel cover 1 is attached to the operation panel 2A by the screws 11 to inhibit the user from directly operating the switch 14A to the button 5B, thus protecting the monitor apparatus 13, the switch 14A to the button 5B and the display portion 6 from being damaged by waterdrops, dust, smudges or the like.

Figure 2:
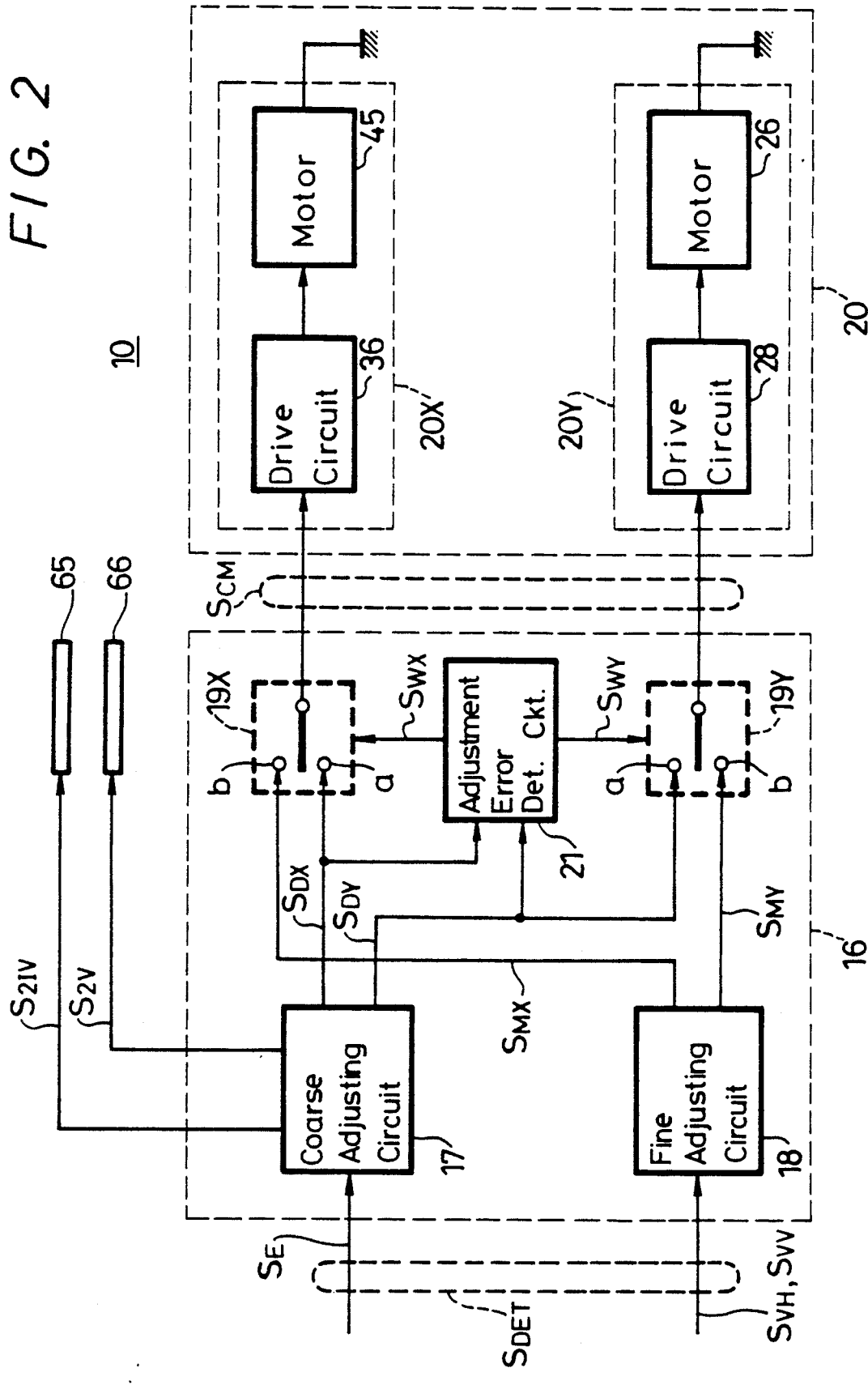
FIG. 2 is a block diagram showing an azimuth adjusting circuit arrangement of the transmitter-receiver apparatus shown in FIG. 1.
Figure 3:
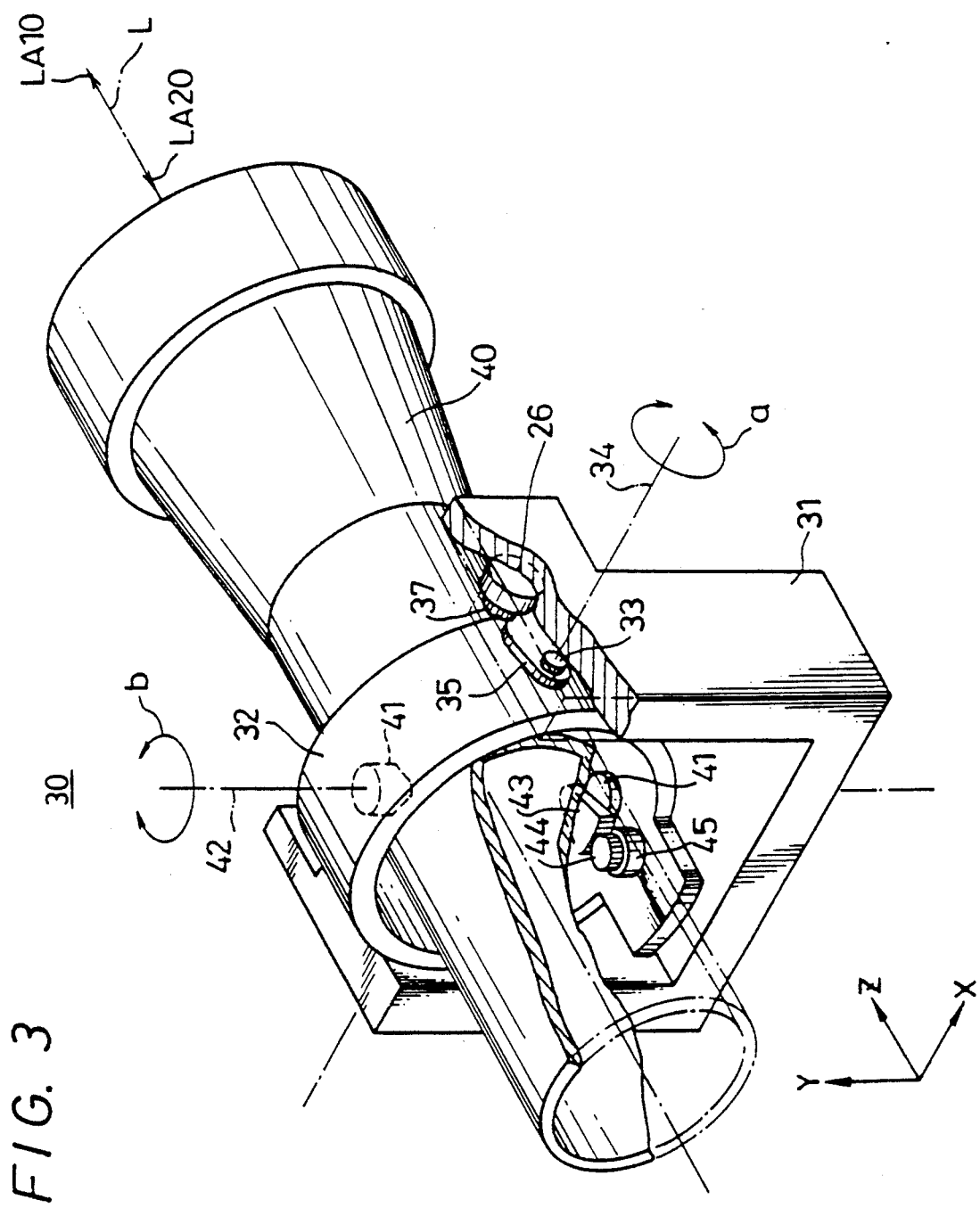
FIG. 3 is a perspective view pictorially illustrating a light beam transmitting-receiving apparatus used in the transmitter-receiver apparatus shown in FIG. 2.

FIGS. 2 and 3 show an alignment control circuit arrangement for the main transmitter-receiver apparatus 10.

Referring to FIG. 2, it will be seen that the main transmitter-receiver apparatus 10 includes an azimuth adjusting circuit 16 which comprises a coarse adjusting circuit 17 and a fine adjusting circuit 18. The coarse adjusting circuit 17 is adapted to coarsely adjust the optical axis L of the light beam LA10 toward the target transmitter-receiver apparatus. The fine adjusting circuit 18 is adapted to fine adjust the azimuth of the optical axis, which was coarsely-adjusted by the coarse adjusting circuit 17 with higher accuracy, whereby the optical axis L of the light beam LA10 substantially becomes coincident with that of the light beam LA20 sent from the target transmitter-receiver apparatus, thereby maintaining a satisfactory optical transmission path in practice.

The coarse adjusting circuit 17 supplies X-axis direction and Y-axis direction coarse adjusting output signal $S_{DX}$ and $S_{DY}$ through fixed contacts a of switching circuits 19X and 19Y to X-axis direction and Y-axis direction driving portions 20X and 20Y of a light beam transmitting-receiving apparatus 20, thereby operating the light beam transmitting-receiving apparatus 20 in the coarse adjustment mode. The fine adjusting circuit 18 supplies X-axis direction and Y-axis direction fine adjusting output signal $S_{MX}$ and $S_{MY}$ through fixed contacts b of the switching circuits 19X and 19Y X-axis and Y-axis direction driving portions 20X and 20Y of the light beam transmitting-receiving apparatus 20, thereby operating the light beam transmitting-receiving apparatus 20 in the fine adjustment mode.

The X-axis direction and Y-axis direction coarse adjusting output signals $S_{DX}$ and $S_{DY}$ are also supplied to an adjustment error detecting circuit 21. The detecting circuit 21 is of a comparing circuit arrangement, and compares the output signals $S_{DX}$ and $S_{DY}$ with a change-over reference value in level. When the coarse adjusting output signals $S_{DX}$ and $S_{DY}$ are higher in level than the reference value, the detecting circuit 21 supplies switching signals $S_{WX}$ and $S_{WY}$ to the switching circuits 19X and 19Y so that the switching circuits 19X and 19Y connect their movable contacts to the fixed contacts a to cause the light beam transmitting-receiving apparatus 20 to enter the coarse adjusting mode. In this state, if the coarse adjusting output signal $S_{DX}$ and $S_{DY}$ become lower than the change-over reference value, the detecting circuit 21 switches the switching circuits 19X and 19Y so that the switching circuits 19X and 19Y connect their movable contacts to the fixed contacts b to cause the light beam transmitting-receiving apparatus 20 to enter the fine adjusting mode.

In this embodiment, the detecting circuit 21 adds the absolute values of Y-axis and X-axis direction coarse adjusting output signal $S_{DY}$ and $S_{DX}$ to generate an added signal K, and determines whether the added signal K is larger than a predetermined value Z.

When the added signal K is larger than the predetermined value Z, or when the relationship between the added signal K and the predetermined value Z is expressed as $$K = |S_{DY}| + |S_{DX}| > Z \qquad (1)$$

the switching circuit 19X and 19Y are changed by the switching control signals $S_{WY}$ and $S_{WX}$ so that the switching circuits 19Y and 19X connect their movable contacts to the fixed contacts a to selectively select the Y-axis direction coarse adjusting output signal $S_{DY}$ and the X-axis direction coarse adjusting output signal $S_{DX}$.

The Y-axis direction coarse adjusting output signal $S_{DY}$ and the X-axis direction coarse adjusting output signal $S_{DX}$ are supplied to driving circuits 28 and 36, respectively in the light beam transmitting-receiving apparatus 20 to thereby still keep the coarse adjusting mode.

When on the other hand the added signal K is below the predetermined value Z, or when the relationship between the added signal K and the predetermined value Z is given by the following equation $$K = |S_{DY}| + |S_{DX}| \leq Z \qquad (2)$$

the detecting circuit 21 supplies the switching control signal $S_{WY}$ and $S_{WX}$ to the switching circuits 19Y and 19X so that the switching circuits 19Y and 19X connect their movable contacts to the fixed contacts b to select the Y-axis direction fine adjusting output signal $S_{MY}$ and the X-axis direction fine adjusting output signal $S_{MX}$, thereby effecting the control in the fine adjusting mode.

The predetermined value Z is selected so that it permits the light beam LA10 to properly irradiate photo detectors V1X, V2X and H1X, H2X (see FIG. 5) provided on the target transmitter-receiver apparatus. Thus, when the added value K of the absolute values of the Y-axis and X-axis coarse adjusting output signals $S_{DY}$ and $S_{DX}$ is larger than the predetermined value Z, this means that the light beam LA10 does not irradiate the range in which the fine adjusting mode is executed. When the added value K of the absolute values of the error signals $S_{DY}$ and $S_{DX}$ falls within a range of the predetermined value Z, this means that the light beam LA10 irradiates the range in which the fine adjusting mode is executed.

As described above, changing the switching circuits 19Y and 19X in position on the basis of the Y-axis and X-axis direction coarse adjusting signals $S_{DY}$ and $S_{DX}$, it is possible to select the coarse adjusting mode and the fine adjusting mode.

The light beam transmitting-receiving apparatus 10 includes a transmitter-receiver optical system 30 shown in a perspective view forming FIG. 3.

Referring to FIG. 3, it will be seen that a mount 31 fixed to the housing 12 (FIG. 1) and having an U-letter configuration supports an annular supporting member 32 on an axis 34 by supporting members 33 so that the azimuth of the optical axis L of the light beam LA10 emitted from the transmitting-receiving optical system 30 can be adjusted in the Y-axis direction (vertical direction).

The supporting member 32 is provided with a gear 35 which rotates around the axis 34, and the gear 35 is meshed with a gear 37, whereby when the gear 37 is rotated with a motor 26 secured to the mount 31, the optical axis L of the light beam LA10 is rotated in the vertical direction accordingly as shown by an arrow a in FIG. 3. The motor 26 is driven by the driving circuit 28 in the Y-axis direction driving portion 20Y as shown in FIG. 2.

The supporting member 32 supports a cylindrical lens supporting member 40 by pivot supporting members 41 so that the lens supporting member 40 can rotate around an axis 42. Thus, the azimuth of the optical axis L of the light beam LA10 can be adjusted in the X-axis direction (left and right direction) as shown in FIG. 3.

The lens supporting member 40 is provided with a gear 43 which rotates around the axis 42, and this gear 43 is meshed with a gear 44, whereby when the gear 44 is rotated by a motor 45 fixed to the supporting member 32, the optical axis L of the light beam LA10 can be rotated in the left and right direction as shown by an arrow b in FIG. 3. The motor 45 appears also in FIG. 2 and is driven by a driving circuit 36 in the X-axis direction driving portion 20X.

Figure 4:
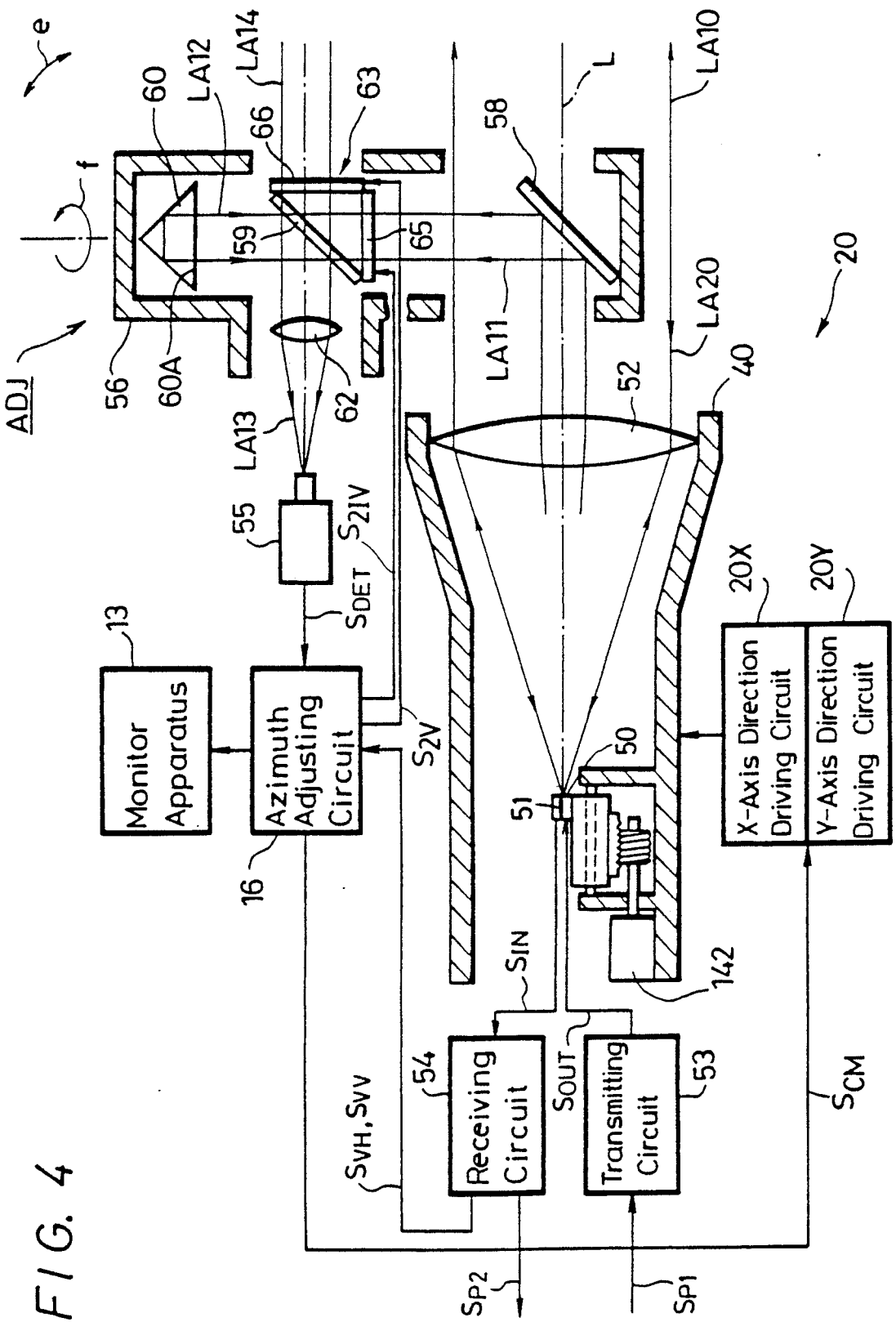
FIG. 4 is a diagrammatic view of a section of a transmitting-receiving optical system of the light beam transmitting-receiving apparatus shown in FIG. 3.

The lens supporting member 40 includes, as shown in FIG. 4, a laser light source 50 and a light receiving portion 51 which are located on the optical axis L so as to be movable along the optical axis L by a focus control motor 142. The laser light source 50 is properly moved to the focus position of a transmitting-receiving lens 52 by the focus control motor 142, and the laser light source 50 then emits the light beam LA10 which travels through the transmitting-receiving lens 52 along the optical axis L. When the light beam LA20 from the target transmitter-receiver apparatus (not shown) travels along the optical axis L, the light beam LA20 is received through the transmitting-receiving lens 52 by the light receiving portion 51 which was properly moved to the focus position of the transmitting-receiving lens 52 by the focus control motor 142.

A transmitting circuit 53 receives an information signal $S_{P1}$ to form a transmission output signal $S_{OUT}$, and the laser light source 50 receives and converts the transmission output signal $S_{OUT}$ to the light beam LA10. The light receiving portion 51 converts the light beam LA20, transmitted from the communication object transmitting-receiving apparatus (not shown), to a receiving input signal $S_{IN}$, and supplies it to a receiving circuit 54.

The receiving circuit 54 forms a receiving information signal $S_{P2}$ from the receiving input signal $S_{IN}$, and also supplies to the fine adjusting circuit 18 of the azimuth adjusting circuit 16 (see FIG. 2) fine adjusting servo error signals $S_{VH}$ and $S_{VV}$ which are transmitted from the target transmitting-receiving apparatus in the signal form of being superimposed upon the receiving information signal $S_{P2}$.

At the target transmitter-receiver apparatus, the fine adjusting servo error signals $S_{VH}$ and $S_{VV}$ are formed such that the irradiation position error of the light beam LA10 irradiated o the communication target transmitting-receiving apparatus from the main transmitting-receiving apparatus 10 are detected by the communication target transmitter receiving apparatus and then to transmitted back to the main transmitter-receiver apparatus 10.

Figure 5:
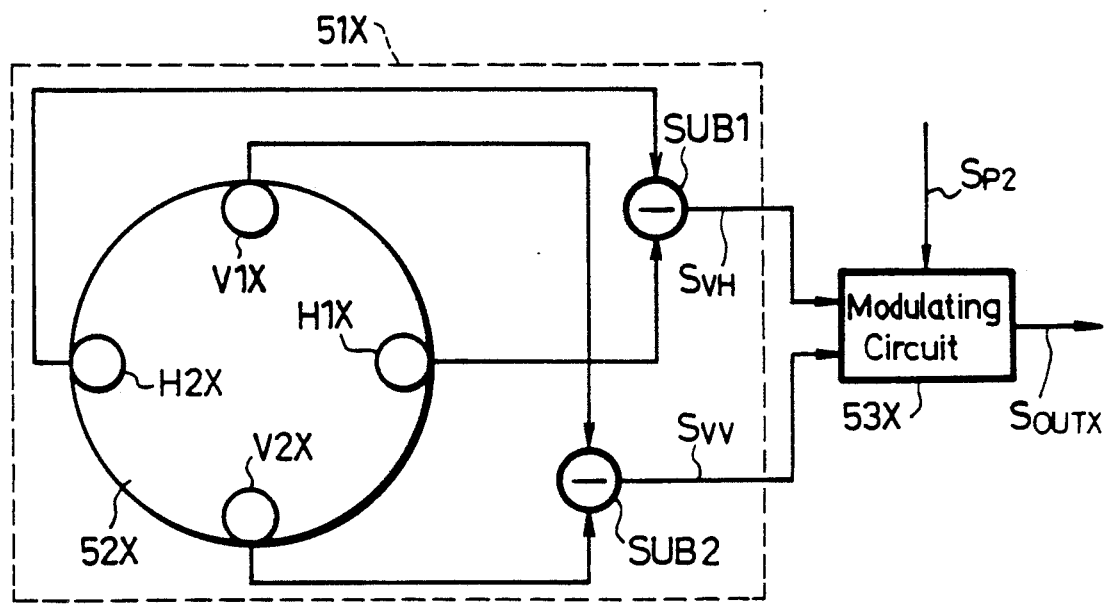
FIG. 5 is a schematic diagram of a fine adjustment optical axis azimuth error detecting circuit used in the transmitter-receiver system of the invention.

As shown in FIG. 5, in the present embodiment, the communication target transmitting-receiving apparatus includes a fine adjustment optical axis azimuth error detecting circuit 51X and detects the displaced amount of the optical axis L of the light beam LA10 transmitted from the main transmitting-receiving apparatus 10 by the four photo detectors H1X, H2X and V1X, V2X located around the incident surface of a transmitting-receiving lens 52X.

More specifically, the photo detectors H1X and H2X are respectively located at the right and left positions of the transmitting-receiving lens 52X, and supply their detected output signals to a subtracting circuit SUB1. The subtracting circuit SUB1 subtracts the detected output signals of the photo detectors H1X and H2X to generate the fine adjusting horizontal servo error signal $S_{VH}$ which changes its level, when the optical axis L of the light beam LA10 is displaced from the center of the lens 52X in the horizontal direction in response to the displaced amount of the optical axis L. This gives the following equation $$S_{VH}=K_H\{P(H1)-P(H2)\} \quad (3)$$

In the equation (3), P(H1) and P(H2) are the amounts of light beams received by the horizontal photo detectors H1X, H2X, and $K_H$ is the proportional constant, respectively.

The vertical photo detectors V1X and V2X are respectively located on the upper and lower sides of the transmitting-receiving lens 52X, and supplies their detected output signals to a subtracting circuit SUB2. The subtracting circuit SUB2 subtracts the detected output signals to generate the fine adjusting vertical servo error signal $S_{VV}$ whose level is changed, when the optical axis L of the light beam LA10 is displaced from the center of the lens 52X in the vertical direction, with the displaced amount of the optical axis L. This gives the following equation $$S_{VV}=K_V\{P(V1)=P(V2)\} \quad (4)$$

In the equation (4), P(V1) and P(V2) are the amounts of light beams received by the vertical photo detectors V1X and V2X, and $K_V$ is the proportional constant.

The communication target transmitting-receiving apparatus supplies the fine adjusting servo error signals $S_{VH}$ and $S_{VV}$ to a modulating circuit 53X. The modulating circuit 53X superimposes the servo error signals $S_{VH}$ and $S_{VV}$ upon the information signal $S_{P2}$, transmitted from the target transmitter-receiver apparatus to the main transmitting-receiving apparatus 10, and transmits an output signal $S_{OUTX}$ which is used to obtain the light beam LA20.

Turning back to FIGS. 2 and 4, the main transmitting-receiving apparatus 10 receives the fine adjusting servo error signals $S_{VH}$ and $S_{VV}$ at the receiving circuit 54 thereof and supplies them to the fine adjusting circuit portion 18 of the azimuth adjusting circuit 16. The azimuth adjusting circuit 16 processes the fine adjusting servo error signals $S_{VH}$ and $S_{VV}$ to generate an optical axis azimuth signal $S_{CM}$ which makes the signal levels of the servo error signals $S_{VH}$ and $S_{VV}$ to zero. The azimuth adjusting circuit 16 supplies such optical axis azimuth signal $S_{CM}$ to the X-axis direction driving portion 20X and to the Y-axis direction driving portion 20Y as shown and described with reference to FIG. 2, thereby correcting the azimuth of the optical axis of the light beam LA10. The light beam LA10 is, as a result, fine adjusted so that the optical axis L thereof may not be displaced from the center of the transmitting-receiving lens 52X of the communication target transmitting-receiving apparatus.

According to the fine adjusting operation in the fine adjusting mode as described above, the main transmitter-receiver apparatus 10 can fine adjust, upon normal operation mode, the emitted direction (namely, the optical axis azimuth) of the light beam LA10 to be identical with the azimuth of the target transmitting-receiving apparatus with sufficient accuracy based upon the fine adjusting servo error signals $S_{VH}$ and $S_{VV}$ transmitted from the target transmitting-receiving apparatus. In addition, the main transmitter-receiver apparatus 10 includes a coarse adjustment optical system ADJ (for use with the coarse adjusting circuit of FIG. 2) which carries out the coarse adjustment operation in the coarse adjustment mode so that the target transmitting-receiving apparatus may receive the light beam LA10 in the transition of the mode from the stop mode to the operation mode such as when the optical atmospheric link system is installed or when it undergoes a maintenance service or inspection.

Referring to FIG. 4, it will be seen that the coarse adjusting optical system ADJ includes a television camera 55 which is mounted on the housing 12 to be unitary. When the television camera 55 utilizes a telephoto lens 62 to pick up an image of the surroundings of a place in which the target transmitting-receiving apparatus is installed, it can pick up the emitted position of the light beam LA20 transmitted from the target transmitting-receiving apparatus as well as an image of its surroundings.

Further, a collimate scope 56 is located in front of the television camera 55 and the transmitting-receiving lens 52. An object bundle of light LA14 travels along the direction substantially parallel to the optical axis L of the light beam LA14 and becomes incident on the collimate scope 56 through a window 63 and a shutter 66. The collimate scope 56 introduces the object bundle of light LA14 incident thereon through a half mirror 59 thereof and the telephoto lens 62 into the television camera 55 as a picked-up image bundle LA13.

Figure 6:
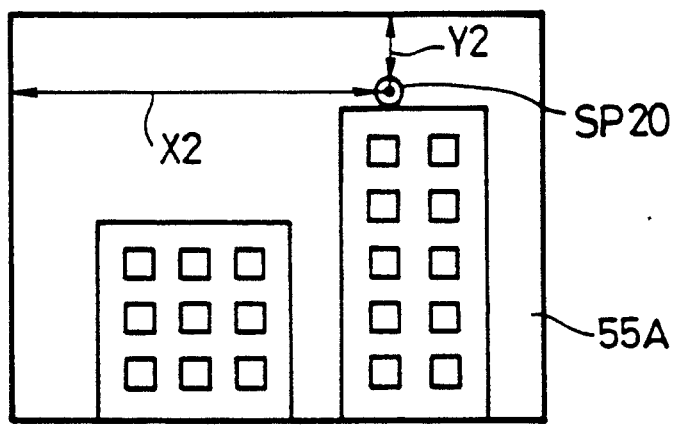
FIG. 6 is a schematic representation of a target screen of a television camera used in the present invention.

As shown in FIG. 6, the television camera 55 focuses through the telephoto lens 62 the image of the surroundings of the target transmitting-receiving apparatus and a light spot SP20 of the light beam LA20 on XY coordinates of a target screen 55A, thus making it possible to detect the coordinate position of the light spot SP20 (emitted position of the light beam LA20), or X2 and Y2.

The main transmitter-receiver apparatus 10 and the target transmitting-receiving apparatus are designed to positively transmit data with large density by decreasing the spot width of the data transmission light beams LA10 and LA20 as much as possible. In fact, the light beams LA10 and LA20 are emitted with a high intensity compared to the intensity of the light of the surroundings energy density are introduced as the object light bundle LA14 through the telephoto lens 62 in the coarse adjusting optical system ADJ into the television camera 55 so that it can be focused on the target screen 55A as the light spot SP20 representing the position of the target transmitting-receiving apparatus.

In this embodiment, the image focused on the target screen 55A is displayed on the monitor 13 provided on the front panel 12A (see FIG. 1) of the housing 12. The visual field of the telephoto lens 62 is selected so as to cover a facility 13A (for example, building, etc.) on which the target transmitting-receiving apparatus is installed and the image of its surroundings to be picked up. The operator can therefore read the position of an image 13B of a receiving light beam emitted from the target transmitting-receiving apparatus as coordinate values on the target screen 55A of the television camera 55, as shown in FIG. 1.

Turning back to FIG. 4, a bundle of light forming one portion of the light beam LA10 emitted through the transmitting-receiving lens 52 is turned toward the lateral direction by a half mirror 58 of the collimate scope 56, and is produced as an extracted light beam LA11 used to detect the emitted position of the light beam. The light beam LA11 passes through light path of the shutter 65, the half mirror 59, a prism 60, the half mirror 59 and the telephoto lens 62 and travels along the direction nearly parallel to the optical axis L of the transmitting-receiving lens 52 through the telephoto lens 62, thereby being introduced into the television camera 55 as a picked-up bundle of light LA13.

The half mirror 59 is located in parallel to the half mirror 58 with high accuracy and causes the extracted light beam LA11 of the half mirror 58 to travel therethrough into the corner cube prism 60.

The corner cube prism 60 is located so that the light beam LA11 becomes incident on its incident surface 60A. Thus, a reflected light beam LA12 having an optical axis parallel to the light beam LA11 is reflected by the corner cube prism 60 and then introduced into the half mirror 59.

Hence, the half mirror 59 reflects the reflected light LA12 at substantially 90 degrees so that the reflected light LA13 (namely, the picked-up bundle of light) is introduced into the television camera 55 through the telephoto lens 62.

Since the half mirrors 58 and 59 are located in parallel to each other with high accuracy, even when the collimate scope 56 is located with an inclination relative to the optical axis L of the light beam LA10 as shown by an arrow e in FIG. 4, the reflected light LA13 parallel to the optical axis L of the light beam LA10 can be obtained.

Further, the reflected light LA11 from the half mirror 58 is returned by the corner cube prism 60, whereby even when the collimate scope 56 is located with a displacement relative to the optical axis L of the light beam LA10 as shown by an arrow f shown in FIG. 4, the reflected light LA13 parallel to the optical axis L of the light beam LA10 can be obtained.

Figure 7:
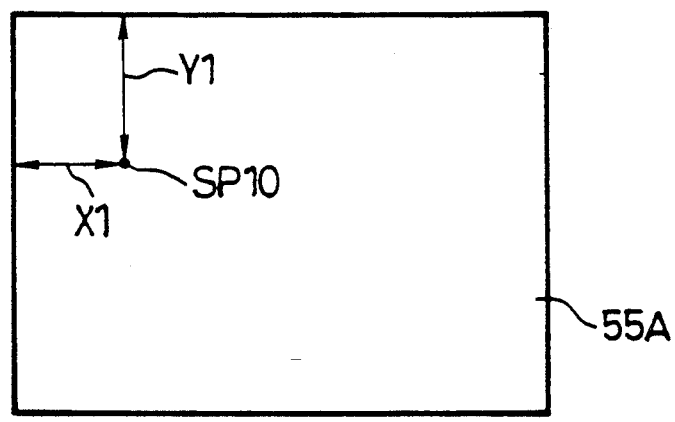
FIG. 7 is a schematic representation of an image of a laser light source formed on the target screen of the television camera and which is used to explain the operation of the present invention.

The television camera 55 therefore focuses the picked-up bundle of light LA10 on the target screen 55A as the light spot SP10, thereby detecting the position of the laser light source 50 as coordinate values on the target screen as shown by X1 and Y1 in FIG. 7.

Since the bundle of light LA12 forming the light spot SP10 is processed by the collimate scope 56 so as to become incident on the television camera 55 as the picked-up bundle of light LA13 substantially parallel to the light beam LA10 as shown in FIG. 4, it is to be understood that the coordinates at which the light spot SP10 is focused on the target screen 55A as shown in FIG. 7 and the coordinates at which the light spot SP20 is focused on the target screen 55A as shown in FIG. 6 equivalently constitute the same coordinate system.

Figure 8:
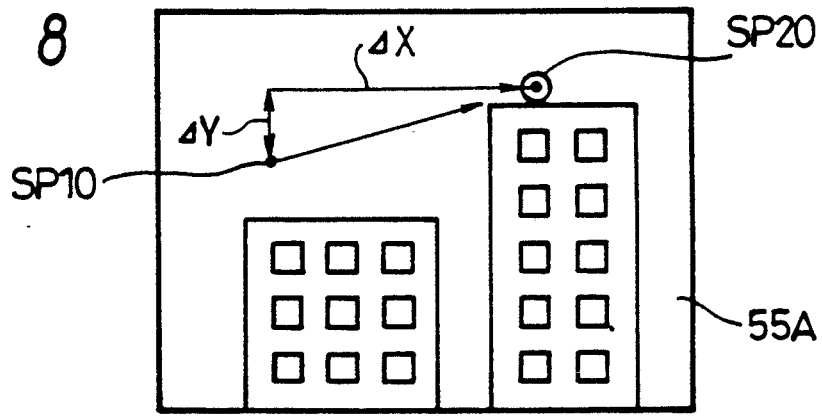
FIG. 8 is a schematic representation of the target screen of the television camera used to explain how to obtain a position error signal.

Consequently, as shown in FIG. 8, the light spot SP10 can equivalently express the position at which the light beam LA10 irradiates the vertical surface including the emitted point of the light beam LA20, thus making it possible to detect the optical axis azimuth error of the light beam LA10 from coordinate position errors $\Delta x$ and $\Delta y$ on the target screen 55A.

In this embodiment, the shutters 65 and 66 (see FIG. 4) are each formed of a liquid crystal optical element. The shutters 65 and 66 are alternately opened and closed by the coarse adjusting circuit 17, (FIG. 2) whereby the television camera 55 can alternately pick up the image of the light beam LA10 and the image of the object bundle of light LA14 transmitted from the target transmitting-receiving apparatus.

Next, the means by which the width of the beam LA10 is controlled will be discussed. Referring to FIG. 9 and FIGS. 10A to 10C, it will be seen that a counter circuit 160 receives a vertical synchronizing signal $S_V$ derived from the television camera 55 to generate a frequency-divided signal $S_{2V}$ whose signal level is changed at a cycle twice as long as that of the vertical synchronizing signal $S_V$. FIG. 10A shows the waveform of the vertical synchronizing signal $S_V$, whereas FIG. 10B shows the waveform of the signal $S_{2V}$. The shutter 66 is driven by the signal $S_{2V}$.

The shutter 65 is driven by an inverted signal $S_{2IV}$, resulting from inverting the frequency-divided signal $S_{2V}$ by an inverting amplifier circuit 161. Thus, the shutters 65 and 66 are operated to alternately open and close at every cycle of the vertical synchronizing signal $S_V$.

The television camera 55 can as a result pick up only the target transmission side during the period T1 in which the frequency-divided signal $S_{2V}$ is at high level. Operating the picture change-over switch 14A (see FIG. 1), it is possible to display the image of the target transmission side on the monitor screen of the monitor apparatus 13 as shown in FIG. 6.

In the image of the target transmission side, the light beam LA20 emitted from the target transmission to the main transmitting-receiving apparatus 10 forms the bright light spot SP20 at the position in which the optical atmospheric link system is installed as shown in FIG. 6.

Detecting the position of the light spot SP20 on the basis of the video signal derived from the television camera 55 during the period T1, it is possible to detect the position of the optical atmospheric link system on the target transmission side.

In that event, if the building as the target transmission side is properly focused by adjusting the telephoto lens 62, then the television camera 55 properly focuses a bundle of light transmitted from substantially an infinite distance on the target screen 55A because the main transmitter-receiver apparatus 10 is located very distant from the target transmission side.

The light spot SP20 provides the smallest spot width when the light beam LA20 is a collimated light. When the light beam LA20 is a diverged light or a converged light, the light spot SP20 provides a larger spot width.

On the other hand, the television camera 55 can pick up only the laser light source 50 during the period T2 in which the inverted signal $S_{2IV}$ is high in level, whereby the bright light spot SP10 is displayed on the monitor screen of the monitor display 13 as an image of the laser light source 50 as shown in FIG. 7.

Thus, when the light beam LA10 is emitted in the form of a parallel light similar to the light spot SP20, or when the laser light source 50 is located at the focus position of the transmitting-receiving lens 52, the light spot SP10 provides the smallest spot width. When the light beam LA10 is transmitted in the form of a diverged or converged light, or when the laser light source 50 is located ahead of or behind the focus point of the transmitting-receiving lens 52, the light spot SP10 increases its spot width in response to its expansion, as shown in FIG. 11.

If, during the period T2 the focus control motor 142 is driven by a video signal $S_E$ derived from the television camera 55 such that the spot width of the light spot SP10 becomes smallest, the light beam LA10 can be adjusted in the form of the parallel light using only the main transmitter-receiver apparatus 10. Thus, the focusing of the light beam LA10 can be adjusted by a simplified arrangement.

Figure 9:
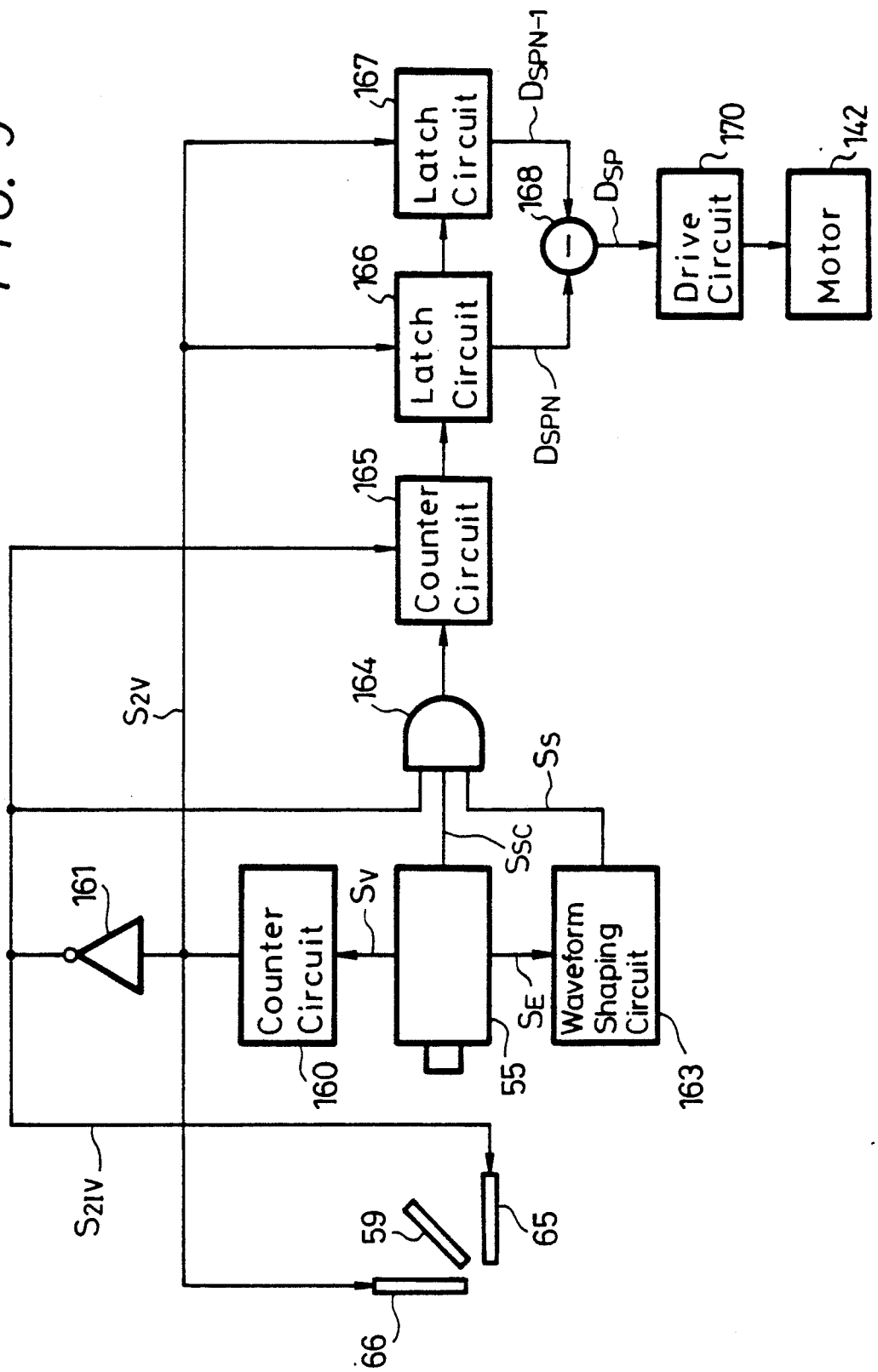
FIG. 9 is a block diagram showing the light beam focus adjustment system of the optical atmospheric link system according to the present invention.
Figure 12:
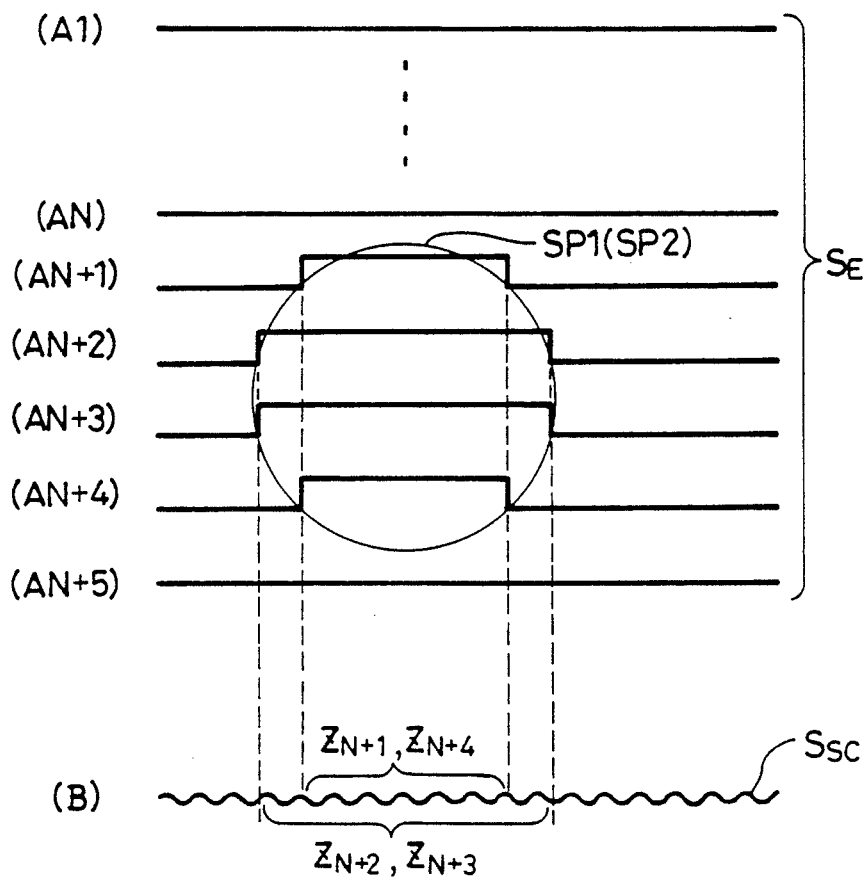
FIGS. 12A and 12B are schematic diagrams used to explain the relationship between a video signal and a light spot.

When the focus adjusting switch 14E is remotely operated to be ON by the remote control commander 8 (see FIG. 1) by the main transmitter-receiver apparatus 10, it enters the focus adjusting operation mode, whereby the video signal $S_E$ (see A1 to AN+5 in FIG. 12) which goes to high level at every timing in which the light spots SP10 and SP20 are scanned, is supplied to a waveform shaping circuit 163 shown in FIG. 9.

Referring to FIG. 9, the waveform shaping circuit 163 generates a waveform shaping signal $S_S$ which goes to logic level [H] at the leading edge of the video signal $S_E$. An AND circuit 164 receives the above-mentioned waveform shaping signal $S_S$ from the waveform shaping circuit 163, and also receives the inverted signal $S_{2IV}$ goes to high level during the period T2 together with a subcarrier signal $S_{SC}$ (see FIG. 12B), whereby the AND circuit 164 supplies the subcarrier signal $S_{SC}$ to a counter circuit 165 during the scanning period of the light spot SP10.

The counter circuit 165 is reset in response to the inverted signal $S_{2IV}$, and detects a wave number Z (a sum formed of wave numbers $Z_{N+1}$, $Z_{N+2}$, $Z_{N+3}$ and $Z_{N+4}$ shown in FIG. 12B) of the subcarrier signal $S_{SC}$ during the scanning period of the light spot SP10.

The spot width of the light spot SP10 can therefore be detected on the basis of the wave number Z of the subcarrier signal $S_{SC}$. In the present embodiment, the spot width of the light spot SP10 can be minimized by driving the focus control motor 142 so that the wave number Z is minimized.

More specifically, as shown in FIG. 9, the frequency-divided signal $S_{2V}$ drives serially-connected latch circuits 166 and 167, and the latch circuit 166 receives the count value of the counter circuit 165, whereby the serially-connected latch circuits 166 and 167 supply the count value $D_{SPN}$ of the counter circuit 165 and a count value $D_{SPN-1}$ of one cycle before to a subtracting circuit 168 together.

Thus, when the laser light source 50 advances toward the focus position of the transmitting-receiving lens 52, the subtracting circuit 168 generates a negative count value $D_{SP}$, while when it moves away from the focus position of the transmitting-receiving lens 52, the subtracting circuit 168 generates a positive count value $D_{SP}$.

A drive circuit 170 constantly drives the focus control motor 142 to rotate at a very slow speed. When the count value $D_{SP}$ from the subtracting circuit 168 is inverted in polarity, the drive circuit 170 reverses the driving direction of the motor 142.

In practice, the spot width of the light spot SP10 is minimized at the focus position of the transmitting-receiving lens 52 (FIG. 11), and the spot width of the light spot SP10 becomes larger when the laser light source 50 is located either ahead of or behind the focus position. Then, the problem is presented that even if only the spot width is detected, it can be detected that the laser light source 50 is not located at the focus position of the transmitting-receiving lens 52, but it cannot be detected whether the laser light source 50 should be moved toward or away from the transmitting-receiving lens 52.

The present embodiment can solve the above-mentioned problem. According to this embodiment, the drive circuit 170 constantly drives the focus control motor 142 to detect the change of the spot width of the light spot SP10, whereby the position of the laser light source 50 relative to the focus position of the transmitting-receiving lens 52 can be detected on the basis of the above detected result i.e. whether the change is positive or negative. Thus, the focusing position of the light beam LA10 can be adjusted by locating the laser light source 50 at the focus position of the transmitting-receiving common lens 52.

The focus control motor 142 is driven at a very slow speed so that even when the data is transmitted while adjusting the focus of the light beam LA10, an appropriate spot width sufficient in practice can be obtained.

Figure 13:
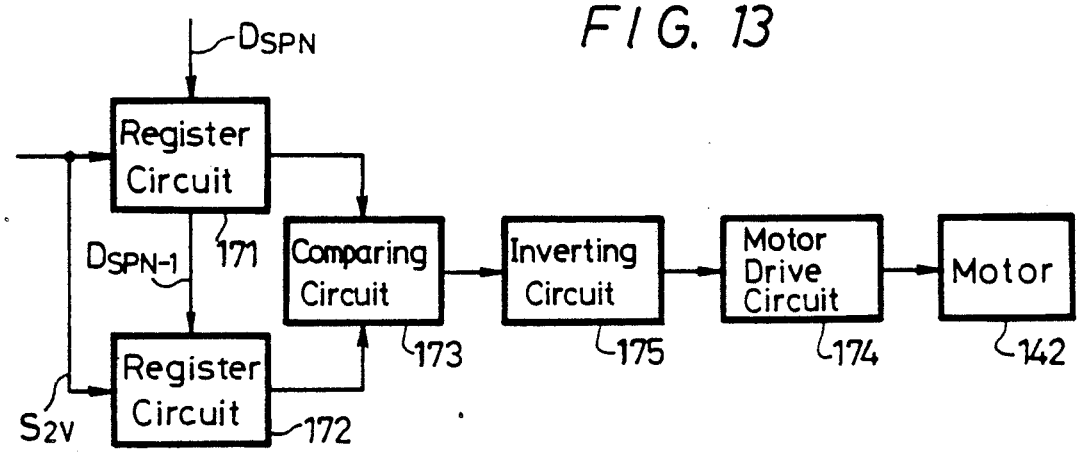
FIG. 13 is a block diagram of a focus adjusting circuit used in the present invention.

As shown in FIG. 13, the latch circuits 166 and 167 shown in FIG. 9 constitute first and second register circuits 171 and 172 which latch the count values $D_{SPN}$ and $D_{SPN-1}$ in response to the frequency-divided signal $S_{2V}$, whereas the subtracting circuit 168 shown in FIG. 9 is constituted of a comparing circuit 173 which compares the count values $D_{SPN}$ and $D_{SPN-1}$.

The drive circuit 170 shown in FIG. 9 is constituted a motor drive circuit 174 which drives the focus control motor 142 and an inverting circuit 175 which inverts the driving direction of the motor 142 on the basis of the compared result from the comparing circuit 173.

The counter circuits 160 and 165, the waveform shaping circuit 163 and the AND circuit 164 shown in FIG. 9 constitute a light spot detecting circuit which detects the spot width of the light spot SP10, whereas the focus control motor 142, the latch circuits 166, 167, the subtracting circuit 168 and the driving circuit 170 also shown in FIG. 9 constitute control means which adjusts the distance between the laser light source 50 and the transmitting-receiving common lens 52 on the basis of the detected result of the light spot detecting circuit.

The positions of the respective light spots are detected during the periods T1 and T2 as described above so that if the laser light source is provided on the receiving apparatus side, the emitted position of the light beam LA10 and the position of the receiving apparatus can be detected by the transmitting apparatus without confusion. Further, the optical axis of the light beam LA10 is adjusted on the basis of the above-mentioned detected result, whereby the optical axis can be properly matched by the simplified arrangement.

If the image on the receiving apparatus side and the image of the laser light source 50 were picked up together as shown in FIG. 8, the positions of the light spots SP10 and SP20 could be detected but it could not be determined which of the light spots SP10 and SP20 corresponded to the light spot of the light beam LA10 or the light spot of the receiving apparatus and vice versa. Thus, it would be unclear in which direction the optical axis L of the light beam LA10 should be corrected. This makes it impossible to properly match the optical axis L of the light beam LA10 accordingly.

In order to solve the afore-noted problem, it may be considered to cause the light beam LA10 to blink. This proposal is not so effective because the light spots SP10 and SP20 are picked up as a single light spot, which cannot be clearly identified when the light spots SP10 and SP20 are close to each other.

According to the present embodiment, the shutters 65 and 66 are alternately opened and closed and the light beam LA13 reflected by the collimate scope 56 and the light beam emitted from the receiving apparatus are alternately introduced into the television camera 55, whereby the light spots SP10 and SP20 can positively be identified, and the direction in which the optical axis is matched can be detected.

Further, in this embodiment, the azimuth of the light beam LA10 can be adjusted on the basis of the video signal $S_E$.

Figure 14:
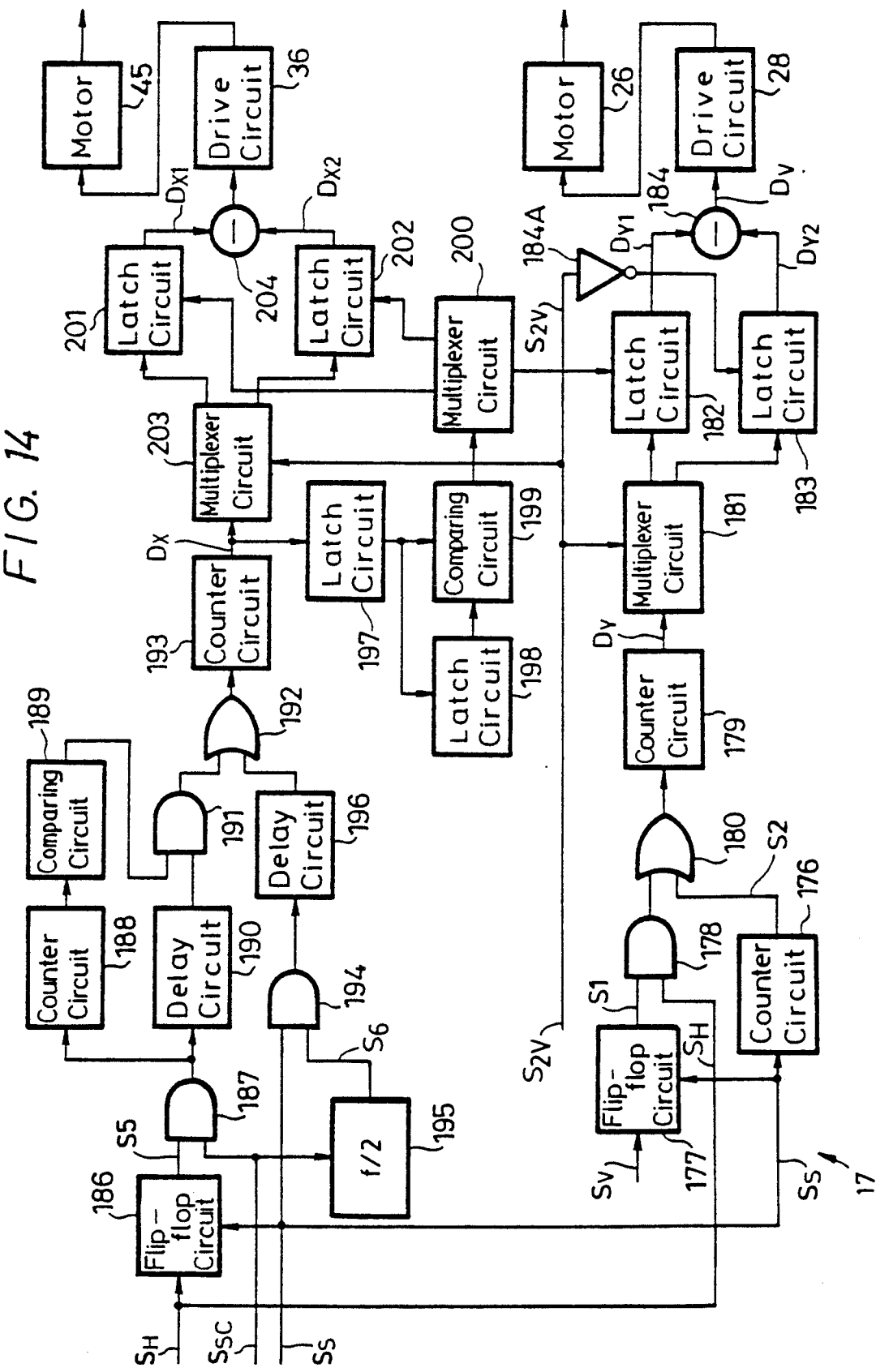
FIG. 14 is a block diagram of the azimuth coarse adjusting circuit used in the present invention.
Figure 15:
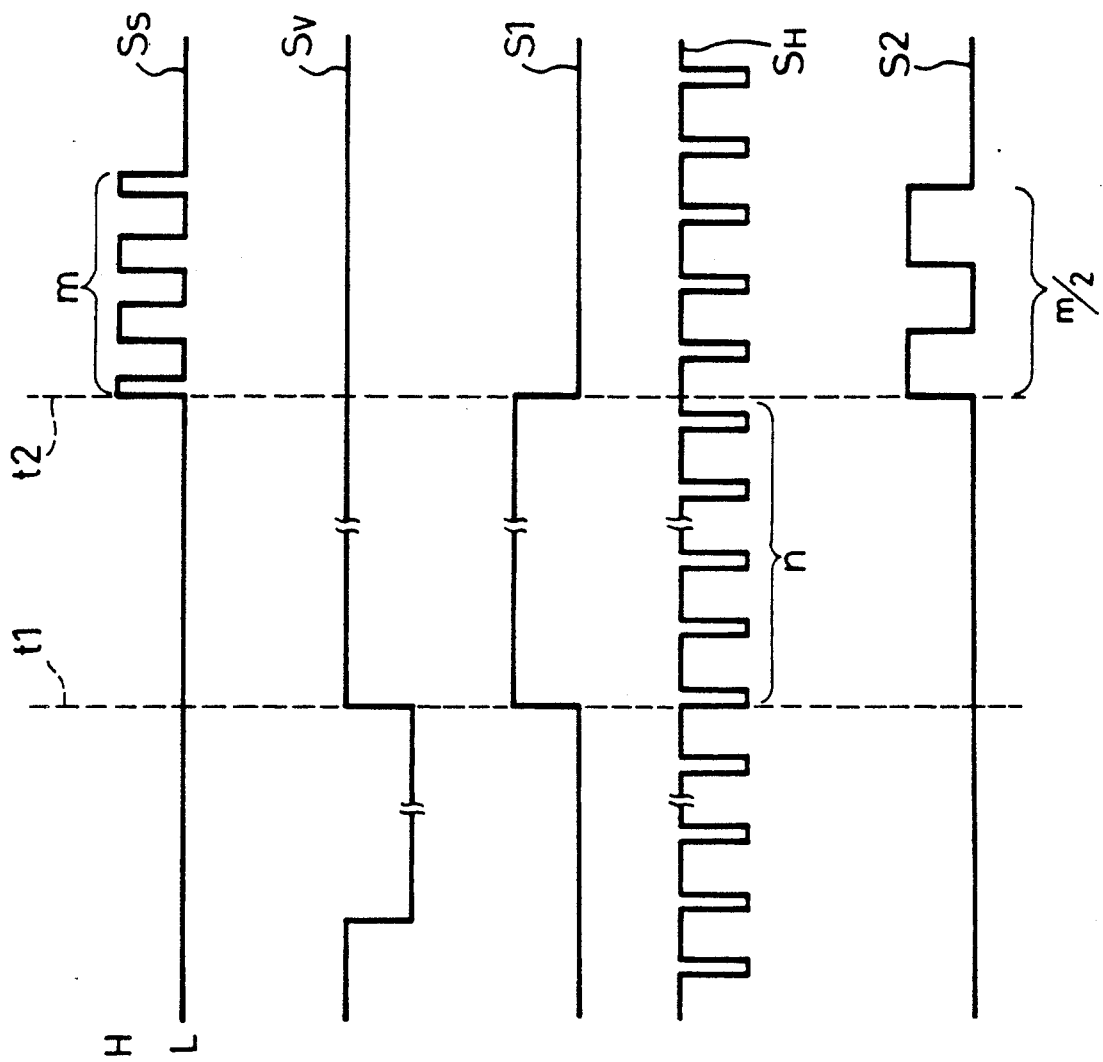
FIGS. 15A, 15B, 15C, 15D and 15E are respectively waveform diagrams to which reference will be made in explaining the operation of the azimuth adjusting circuit shown in FIG. 14.

As shown in FIGS. 14 and 15, in the azimuth coarse adjusting circuit 17, a waveform shaping signal $S_S$ (see FIG. 15A) is supplied from the waveform shaping circuit 163 (FIG. 9) to a counter circuit 176 and to one input of a flip-flop circuit 177, and a vertical synchronizing signal $S_V$ (see FIG. 15B) from the camera 55 and the waveform shaping signal $S_S$ is supplied, another input of the flip-flop circuit 177 whereby an AND circuit 178 generates a logical sum of an output signal S1 (FIG. 15C) from the flip-flop circuit 177 and a horizontal synchronizing signal $S_H$ from the camera 55 (see FIG. 15D). As shown in FIG. 15C, the output signal S1 goes to logic level [H] at a time point t1 in which the vertical synchronizing signal $S_V$ goes to high level and which goes to low level at a time point t2 in which the waveform shaping signal $S_S$ goes to logic level [H].

The counter circuit 176 generates a signal S2 (see FIG. 15E) which is provided by dividing the waveform shaping signal $S_S$ by 2. This signal S2 and the output signal from the AND circuit 178 are supplied through an OR circuit 180 to a counter 179, whereby the vertical distance Y1 or Y2 (in FIG. 6 or 7) between the scanning start portion on the picked-up image to the center position of the light spot SP10 or SP20 is calculated by the number of horizontal lines. The number of the horizontal lines is a value in which the distance between the starting portion of the raster scanning and the center of the light spot in the video signal $S_E$ (from A1 to AN+5 shown in FIG. 16) is expressed by the horizontal scanning line number n+m/2.

A multiplexer 181 under the control of the signal $S_{2V}$ alternately supplies the count value $D_Y$ of the counter 179 to latch circuits 182 and 183 at every vertical cycle period, whereby a subtracting circuit 184 detects a position error Δy (see FIG. 8) of the position at which the light beam LA10 irradiates the transmission object or target.

The drive circuit 28 drives the motor 26 so as to make the subtracted value representing the position error Δy equal to zero, thereby adjusting the irradiated position in the vertical direction.

From the camera 55, a flip-flop circuit 186 receives the horizontal synchronizing signal $S_H$ at one input (see FIGS. 16B and 17A) and the waveform shaping signal $S_S$ (see FIG. 17B) at a reset input, thereby generating an output signal S5. As shown in FIG. 17C, the output signal S5 goes to logic level [H] at a time point t5 in which the horizontal synchronizing signal $S_H$ goes to high level and goes to logic level [L] at a time point t6 in which the waveform shaping signal $S_S$ goes to logic level [H].

An AND circuit 187 receives the output signal S5 and the subcarrier signal $S_{SC}$ (see FIGS. 16C and 17D) and supplies its output signal to a counter 188, whereby the period of time in which the waveform shaping signal $S_S$ goes to a logic level [H] at the light spot SP10 or SP20 after the horizontal synchronizing signal $S_H$ went to high level can be detected by the wave number N of the subcarrier signal $S_{SC}$.

A comparing circuit 189 opens, when the count value N of the counter 188 is less than a predetermined value, the gate of an AND circuit 191, thereby supplying the output signal of the AND circuit 187 as delayed by a delay circuit 190, through one input of an OR circuit 192 to a counter 193.

When the light spot SP10 or SP20 is not placed on the scanning line, while the waveform shaping signal $S_S$ does not go to logic [H] level, the horizontal synchronizing signal $S_H$ goes to high level in the next scanning line.

Thus, only when the count value N of the counter circuit 188 is less than the predetermined value, the delayed output signal of the AND circuit 187 is supplied to the counter 193, whereby only when the light spot SP10 or SP20 exists on the scanning line, the subcarrier signal $S_{SC}$ is supplied to the counter circuit 193. Hence, through the counter 193, the horizontal distance from the scanning start portion to the light spot SP10 or SP20 on the picked-up image can be detected by the wave number N (see FIG. 16) of the subcarrier signal $S_{SC}$.

An AND gate 194 receives as separate inputs the output signal S6 of a frequency divider circuit 195 (see FIG. 17E) which results from frequency-dividing the subcarrier signal $S_{SC}$ by 2 and also the waveform shaping signal $S_S$, thereby supplying an output signal expressing the spot width of the light spot SP10 or SP20 to another input of the OR circuit 192 via a delay circuit 196 having a delay time of one horizontal period (1H).

Figure 16:
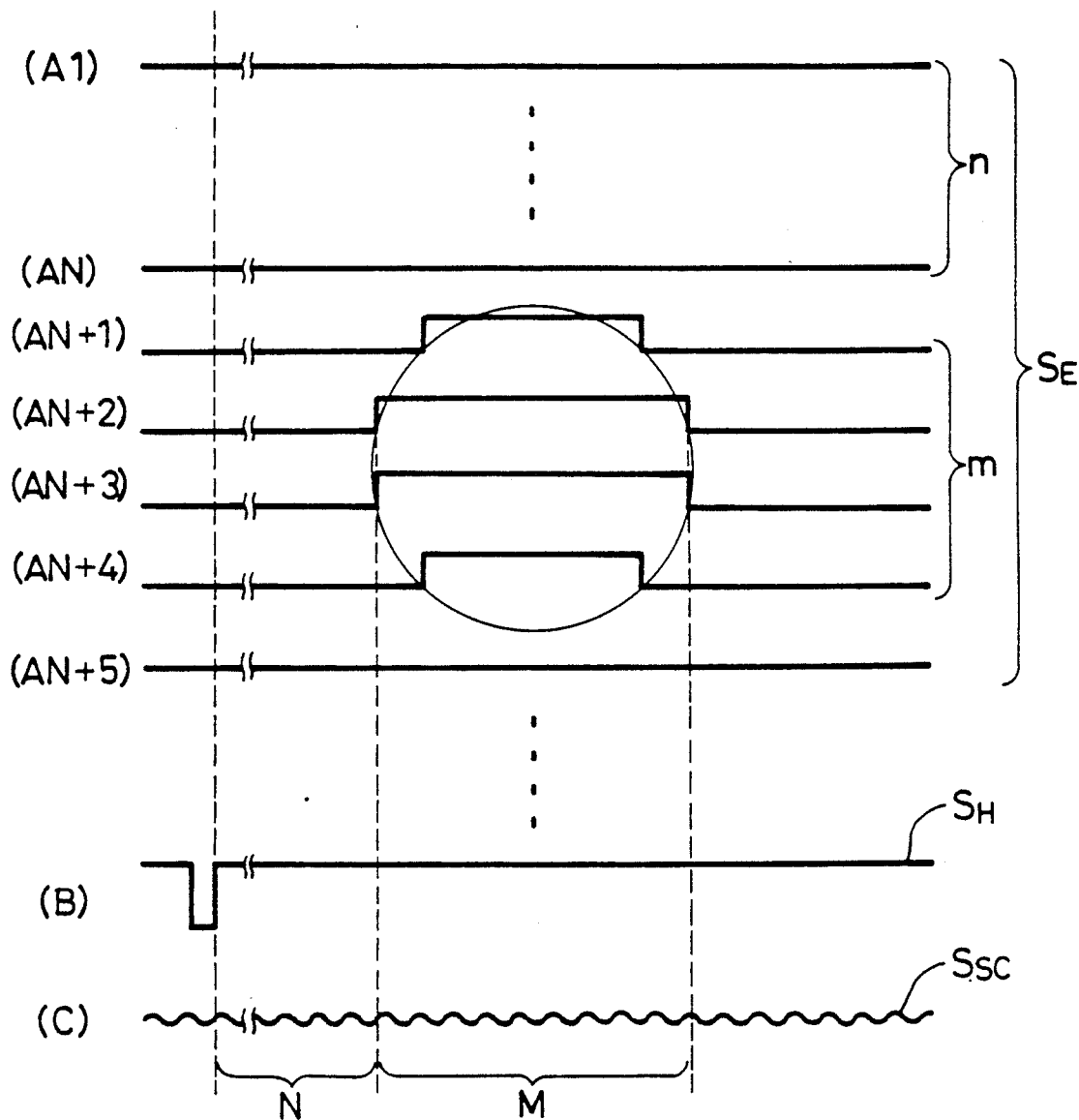
FIGS. 16(A1), 16B and 16(C) are schematic diagrams of the relationship between a video signal and a light spot and are useful for explaining the operation of the azimuth adjusting circuit of the invention shown in FIG. 14.

The counter 193 therefore produces an output $D_X$ by counting the wave number N of the subcarrier signal $S_{SC}$ and then counting a value M/2 which is half of the value M expressing the spot width of the light spot SP10 or SP20, whereby the horizontal distance X1 or X2 (see FIGS. 6 and 7) between the scanning start portion to the center position of the light spot SP10 or SP20 on the picked-up image can alternately be detected by the wave number N of the subcarrier signal $S_{SC}$ (see FIG. 16).

Latch circuits 197 and 198 sequentially receive the output signal of the counter circuit 193 in synchronism with the horizontal synchronizing signal $S_H$, thereby supply the count values $D_X$ of two adjacent scanning lines to a comparing circuit 199.

The comparing circuit 199 generates a latch signal which goes to high level after the count value $D_X$ of the two succeeding scanning lines is increased, it is not changed. This latch signal is supplied through a multiplexer circuit 200 to latch circuits 201 and 201 alternately.

A multiplexer 203 under the control of the signal $S_{2V}$ alternately supplies the output signal of the counter 193 to the latch circuits 201 and 202, whereby the latch circuits 201 and 202 respectively supply horizontal position data $D_{X1}$ and $D_{X2}$ of the light spots SP10 and SP20 to a subtracting circuit 204.

Hence, the subtracting circuit 204 detects a horizontal displaced amount between the two light spots SP10 and SP20. The drive circuit 36 drives the motor 45 on the basis of the detected result from the subtracting circuit 204, thereby adjusting the irradiating position in the horizontal direction.

More specifically, the drive circuit 36 determines whether the subtracted value indicating the distance $\Delta x$ is positive or negative, and drives the motor 45 on the basis of the detected result so as to make the subtracted value zero.

With the thus made arrangement, the light beam LA10 emitted from the laser light source 50 and modulated by the predetermined data signal is transmitted through the transmitting-receiving common lens 52 to the transmission object. Also, the optical axis thereof is turned by the collimate scope 56 so as to be in parallel and is then introduced into the television camera 55. The television camera 55 alternately generates the image of the laser light source 50 and the image of the transmission object in synchronism with the vertical synchronizing signal $S_V$.

Referring back to FIG. 9, the video signal $S_E$ from the television camera 55 is supplied to the waveform shaping circuit 163, in which it is converted to the waveform shaping signal $S_S$ which goes to logic level [H] at the light spots SP10 and SP20. This waveform shaping signal $S_S$ is supplied through the AND circuit 164 to the counter circuit 165, thus resulting in the spot width of the light spot SP10 being detected.

The detected result is sequentially latched in the latch circuits 166 and 167, and the output signals of the latch circuits 166 and 167 are supplied to the subtracting circuit 168, whereby it is detected whether the laser light source 50 is moved toward or away from the focus position of the transmitting-receiving common lens 52. Then, on the basis of the detected result, the drive circuit 170 reverses the rotating direction of the focus control motor 142, thereby placing the laser light source 50 at the focus position of the transmitting-receiving common lens 52. Thus, the light beam LA10 emitted from the main transmitter-receiver apparatus 10 is collimated.

With the afore-noted arrangement, since the light beam LA10 is bent in parallel and then picked up and the spot width of the light spot SP10 on the basis of the resultant video signal is detected, the light beam LA10 can be adjusted to be a parallel light using only the optical atmospheric link system or the main transmitter-receiver apparatus 10.

Hence, the light beam can be adjusted to be a parallel light without a communication line extended from the transmission object side to the target transmitting-receiving apparatus side unlike the prior art, which therefore provides a simplified arrangement and an easy focus adjustment of the light beam.

While the shutters 65, 66, each formed of liquid crystal optical element, are alternately opened and closed in the above-mentioned embodiment, the present invention is not limited to the above-mentioned shutters but can be applied to a wide variety of shutters such as an electrical shutter and a mechanical shutter.

Figure 18:
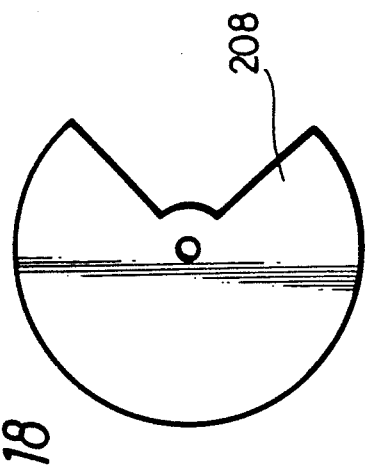
FIG. 18 is a plan view illustrating another example of light-shielding plate used in a further embodiment of the present invention.
Figure 19:
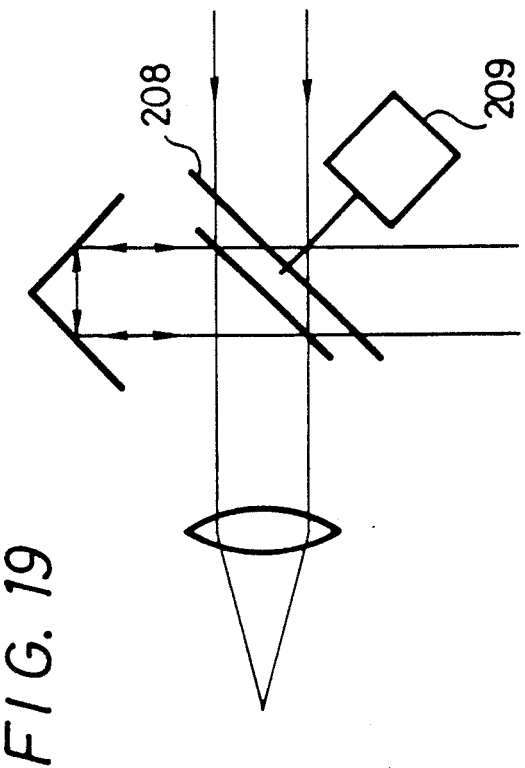
FIG. 19 is a schematic view used to explain how to operate the light-shielding plate shown in FIG. 18.

In this case, as shown in FIGS. 18 and 19, in place of the shutters 65 and 66, a light-shielding plate 208 having a cut-away portion of a predetermined angle is provided on the light path and is rotated by a motor 209 in synchronism with the vertical synchronizing signal.

While the half mirrors 58, 59 and the corner cube prism 60 are used to parallelly bend the light beam LA10 in the foregoing embodiment as described above, the half mirrors 58 and 59 may be replaced with a prism having a configuration of parallelogram configuration. This will be explained with reference to FIG. 20.

Figure 20:
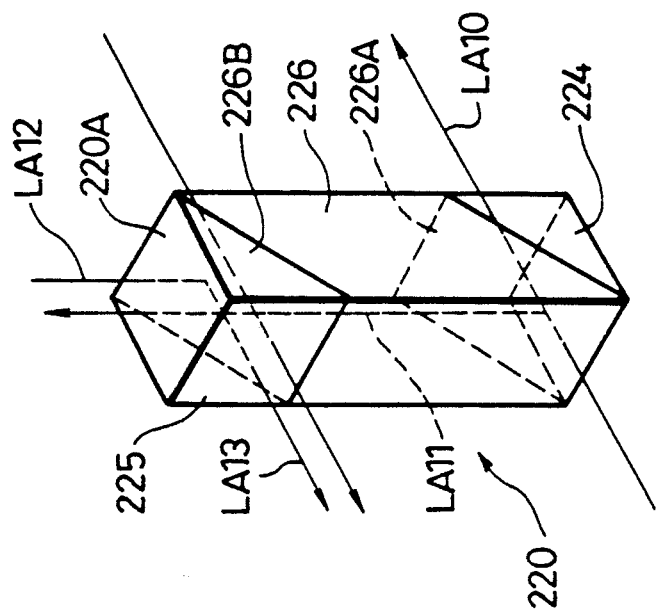
FIG. 20 is a perspective view of an optical block used in the collimate scope of the present invention.

Referring to FIG. 20, it will be seen that an optical block 220 is formed by bonding right angle prisms 224 and 225 and a parallelogram prism 226. Inclined faces 226A and 226B of the parallelogram prism 226 present the parallelism with high accuracy.

Further, an aluminum thin film is deposited on the inclined faces 226A and 226B of the parallelogram prism 226 to cause the inclined faces 226A and 226B to act as half mirrors.

The optical block 220 is located to direct its inclined face 226A toward the transmitting-receiving common lens 52, whereby the light beam LA10 travels straight therethrough and is also reflected thereon at about 90 degrees. The reflected light LA11 travels through the inclined face 226B to the corner cube prism 60 (see FIG. 4).

The corner cube prism 60 is located so as to oppose its incident face to an emitting face 220A of the reflected light LA11, whereby a reflected light LA12 of the reflected light LA11 is introduced into the optical block 220 via the corner cube prism 60 in parallel to the reflected light LA12.

In the optical block 220, the reflected light LA12 is reflected, as a result, on the inclined face 226B parallel to the inclined face 226A at substantially 90 degrees and the reflected light LA13 is introduced into the television camera 55.

Hence, the image of the laser light source 50 can be observed on the basis of the reflected light LA13 incident on the television camera 55.

The inclined faces 226A and 226B of the parallelogram prism 226 are arranged with parallelism of high accuracy so that even when the collimate scope 56 is displaced from the optical axis of the light beam LA10 as shown by the arrow e in FIG. 4, or when the inclined face 226A of the parallelogram prism 226 is not precisely opposed to the lens 52 at 45 degrees, the television camera 55 can receive the reflected light LA13 parallel to the optical axis of the light beam LA10.

Further, the reflected light LA11 from the inclined face 226A is reflected on the corner cube prism 60 at the 180 degrees as described above so that even when the collimate scope 56 is displaced from the optical axis of the light beam LA10 as shown by the arrow f in FIG. 4, the television camera 55 can receive the reflected light LA13 parallel to the optical axis of the light beam LA10.

According to this kind of optical system, it is possible to obtain an error of the parallelism of the reflected light LA13 relative to the light beam LA10 with high accuracy less than 10 seconds. In this case, if the accuracy error of 10 seconds occurs, then a position error of 48 mm is produced at the position apart by 1 km, thus making it possible to adequately detect the irradiated position of the light beam LA10.

While the spot width of the light spot SP10 is detected on the basis of the horizontal synchronizing signal and the subcarrier signal in the above embodiment, the present invention is not limited to the above-mentioned detecting means but can be applied to a wide variety of detecting means in which other reference clock signals are counted to detect or the like.

Further, while the light beam LA10 is collimated by moving the laser light source 50 in the above-mentioned embodiments, the present invention can be modified such that the light beam LA10 is collimated by adjusting the lens position.

Furthermore, while the focus adjustment is effected so that the light beam LA10 is collimated in the above embodiment, the present invention is not limited to the above-mentioned embodiments but can be modified such that the light beam LA10 may be adjusted to be emitted with a predetermined width.

Figure 21:
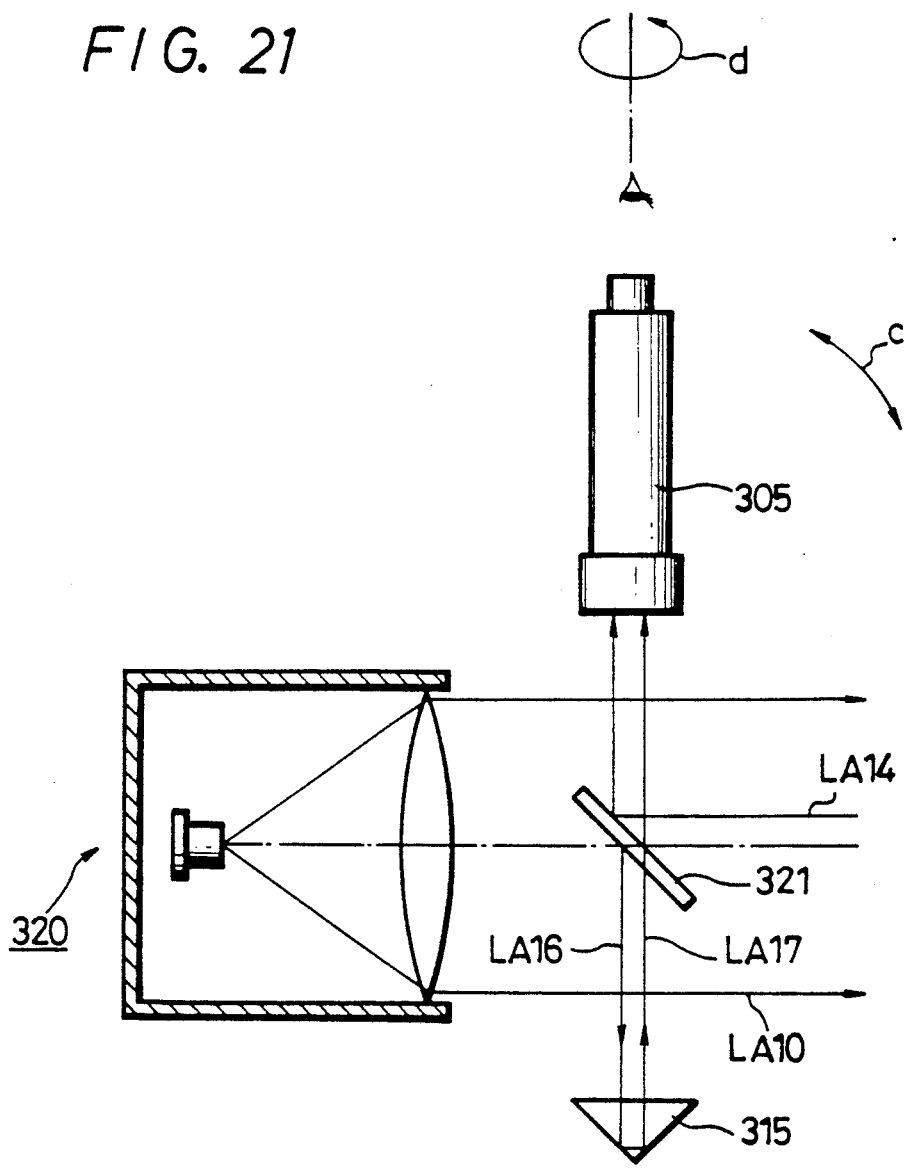
FIG. 21 is a diagrammatic view showing a main portion or collimate scope portion of yet a further embodiment of an optical atmospheric link system according to the present invention.

A further embodiment of the present invention will hereinafter be described with reference to FIG. 21. FIG. 21 shows only a main portion of this embodiment, namely, its collimate scope portion for simplicity.

In FIG. 21, reference numeral 320 generally designates a light transmitting apparatus of the optical atmospheric link system of the present embodiment. In the transmitting apparatus 320, as shown in FIG. 21, a half mirror 321 is located on the optical axis L of the light beam LA10 with an inclination of substantially 45 degrees, and this half mirror 21 and a corner cube prism 315 constitute the collimate scope.

The face of the half mirror 321 is formed with high accuracy, and to reflect the incident light with the light amount of about half thereof.

Hence, one portion of the light beam LA10 is passed through the half mirror 321, and a light beam LA16 of the light beam LA10 reflected on the half mirror 321 becomes incident on the corner cube prism 315.

A light beam LA14 from the target transmitting-receiving apparatus (not shown) is incident on the transmitting apparatus 320 along the traveling direction of the light beam LA10 and is reflected by the half mirror 321 so that it travels in the opposite direction of the reflected light beam LA16, thus resulting in the light beam LA14 being introduced into a telescope 305. It is needless to say that the telescope 305 in FIG. 21 may be replaced with the television camera 55 constructed as shown in FIG. 4.

The corner cube prism 315 is formed such that it introduces a reflected light beam LA17 whose optical axis is parallel to the reflected light beam LA16 through the half mirror 321 to the telescope 305.

The telescope 305 can pick up, as a result, the reflected light beam LA17 emitted from the irradiated position of the light beam LA10, whereby an image similar to that provided when the laser light source is located at the irradiated position can be overlapped on the image of the receiving apparatus side and can be viewed, thus making it possible to visually confirm the irradiated position of the light beam on the transmitting apparatus 320 side positively and easily.

Since the half mirror 321 is located on the optical axis L of the light beam LA14 as described above, the incident light beam traveling in the opposite direction of the light beam LA10 along the optical axis L of the light beam LA10 can be introduced into the telescope 305 as a light beam parallel to the reflected light beam LA17, which provides the state having parallax.

Further, since the single half mirror 321 is located on the optical axis of the light beam LA10 only, the overall arrangement of the apparatus can be simplified by that much.

Furthermore, the reflected light beam LA16 reflectd on the half mirror 321 is reflected in the direction parallel to the same by the corner cube prism 315 and is introduced into the telescope 305 from the direction parallel to the incident light beam LA14 traveling in the opposite direction to the light beam LA10 from the emitted direction of the light beam LA10 as described above. Thus, even when the half mirror 321 is not accurately located with an inclination of 45 degrees, it is possible to receive the reflected light beam LA17 which travels as though it were emitted from the irradiated position of the light beam LA10.

Hence, if the half mirror 321 and of the corner cube prism 315 are produced with high accuracy of surfaces, the irradiated position of the light beam LA10 can be confirmed with high accuracy.

The face of the half mirror 321 is produced with high accuracy as compared with the corner cube prism 315 so that . if the corner cube prism 315 is produced with high accuracy in the manufacturing-process, then it becomes possible to obtain an adequate detection accuracy.

Experimental results demonstrate that when the corner cube prism 315 having a face accuracy of 2 seconds was employed, the position error at the position apart therefrom by 1 km could be suppressed to 9 mm.

The high detection accuracy can be provided by increasing the accuracy of the corner cube prism 315 in the manufacturing-process as described above. The irradiated position of the light beam can be confirmed with high accuracy regardless of when the whole collimate scope is located with an inclination relative to the optical axis L of the light beam LA10 as shown by an arrow c in FIG. 21, of when the collimate scope 305 is twisted with a displacement relative to the optical axis L of the light beam LA10 as shown by an arrow d in FIG. 21 or of when the telescope 305 is located with an inclination.

While in the above-mentioned embodiment shown in FIG. 21 the collimate scope is comprised of the half mirror 321 and the corner cube prism 315, the present invention is not limited thereto but can be modified such that the half mirror 321 and the corner cube prism 315 may be formed as one optical block to be unitary.

Figure 22:
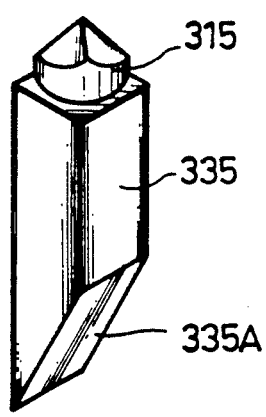
FIG. 22 is a perspective view showing another example of an optical block used in the collimate scope of the present invention.

More specifically, as shown in FIG. 22, the corner cube prism 315 is bonded to an optical block 335 which is rectangular in cross section and has a half mirror face 335A at its one end to form the optical block.

Figure 23:
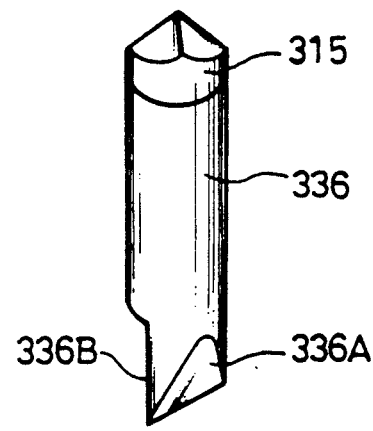
FIG. 23 is a perspective view of a further example of an optical block used in the collimate scope of the present invention.

Alternatively, as shown in FIG. 23, there is provided an optical block 336 which is circular in cross section and has a half mirror face 336A and a flat incident surface 336B formed on its end. The corner cube prism 315 is bonded to this optical block 336 to form the optical block. Hence, the collimate scope can be simplified in construction, which provides the more simplified arrangement.

While in the above-mentioned embodiments the half mirror 321 is located on the optical axis L of the light beam LA10, the half mirror 321 is not always located on the optical axis L of the light beam LA10 but it may be located within the bundle of the light beam LA10, making it possible to detect the irradiated position of the light beam adequately.

While in the above-mentioned embodiments the half mirror 321 has the reflection efficiency of half of the incident light amount, the present invention is not limited thereto but it is possible to employ a half mirror having a high reflection efficiency or a half mirror having a low reflection efficiency, if necessary.

While one portion of the light beam LA10 emitted from the lens having the large numerical aperture (NA) is introduced into the telescope 305 in the above embodiments, the present invention is not limited to the above embodiment but can be varied as follows. That is, the whole of the light beam LA10 is introduced into the telescope 305 and the collimate scope may be removed after the completion of the adjustment.

Figure 24:
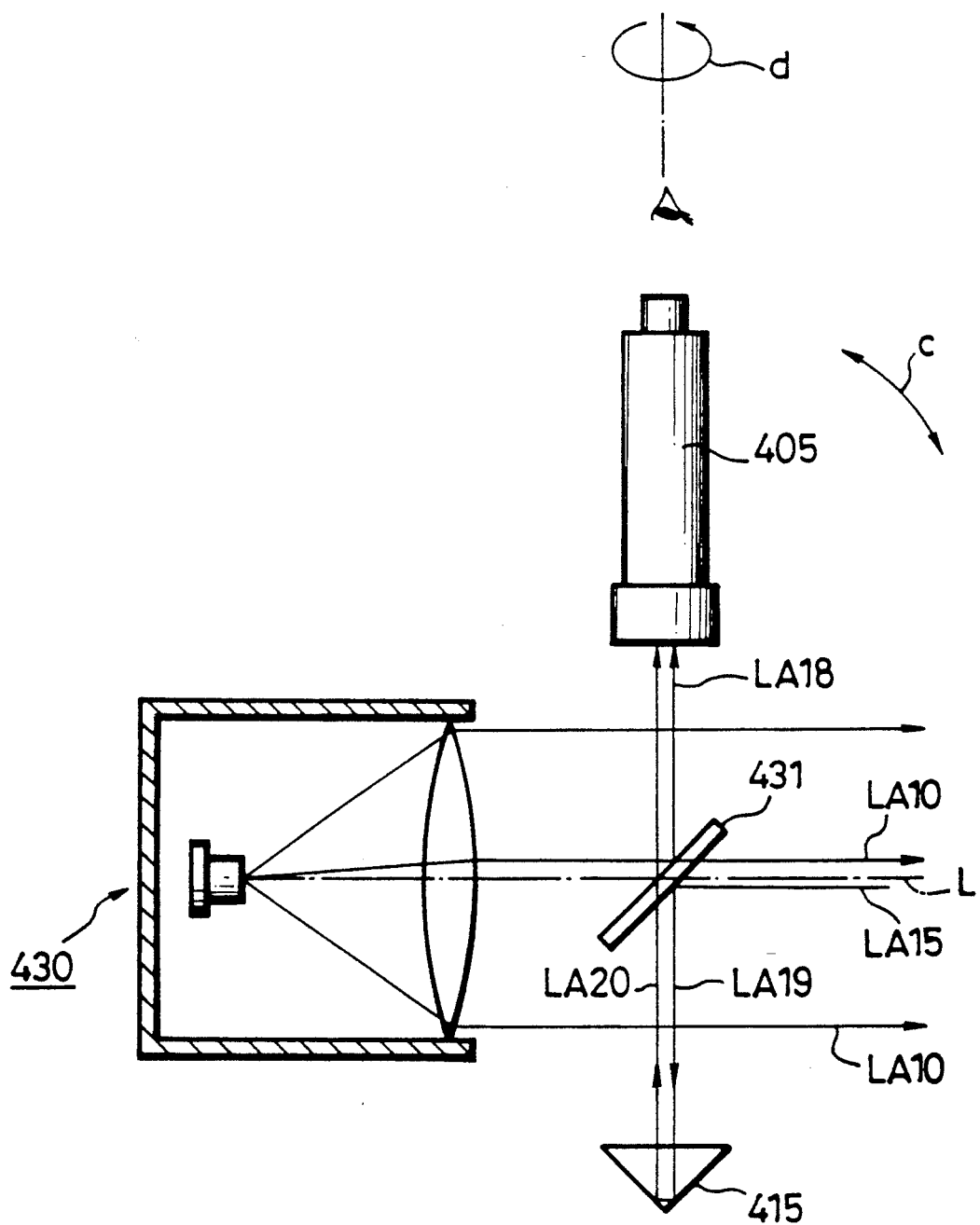
FIG. 24 is a diagrammatic view showing a main portion or collimate scope portion of still a further embodiment of an optical atmospheric link system according to the present invention.

Yet a further embodiment of the present invention will be described with reference to FIG. 24. FIG. 24 illustrates only its collimate scope portion, which is the main portion of the embodiment, for simplicity.

In FIG. 24, reference numeral 430 generally designates a transmitting apparatus of the optical atmospheric link system of the present embodiment. In the transmitting apparatus 430, a half mirror 431 is located on the optical axis L of the light beam LA10 with an inclination of about 45 degrees. The half mirror 431 and the corner cube prism 415 constitute the collimate scope.

The face of the half mirror 431 is formed with high accuracy, and is also arranged to reflect about half of the amount of the incident light, whereby one portion of the light beam LA10 travels through the half mirror 431 and its reflected light beam LA18 from the half mirror 431 becomes incident on a telescope 405.

The optical system of telescope or the like is provided with a lens on its incident surface so that the light amount of the so-called reflected back light beam reflected on the incident surface and which is fed through the half mirror 431 and a lens back to the laser light source can be considerably reduced.

As compared with the embodiment shown in FIG. 21, the amount of the reflected back light beam can be reduced in an enough range in practice and the light beam LA10 having less noise as compared with the prior art can be obtained, thus making it possible to transmit data of high quality.

On the other hand, the light beam LA15 incident on the transmitting apparatus 430 from the irradiated direction of the traveling light beam LA10 is reflected by the half mirror 431 in the direction opposite to that of the reflected light LA18 and its reflected light LA19 becomes incident on the corner cube prism 415.

The corner cube prism 415 therefore produces a reflected light beam LA20 which is parallel to the optical axis of the reflected light beam LA19, and the reflected light beam LA20 passes through the half mirror 431 and becomes incident on the telescope 405.

Thus, in the reflected light beam LA20, the component of the incident light beam LA15 whose optical axis is parallel to the light beam LA10 is introduced into the telescope 405 parallel to the reflected light beam LA18 of the light beam LA10, thus making it possible to obtain the reflected light beam LA20 emitted as though it were emitted from the irradiated position of the light beam LA10.

Hence, the same image as that provided when the laser light source is located at the irradiated position can be overlapped on the image of the receiving apparatus side and can be visually confirmed. This makes it possible to easily and positively confirm the irradiated position of the light beam on the transmitting apparatus 403 side.

Although the preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. In an optical atmospheric link system for transmitting and receiving light beams carrying information signals between a transmitter means and a receiver means which is located apart from the transmitter means, the transmitter means comprising:
   light source means for generating a first light beam modulated with an information signal;
   first optical system means for transmitting the first light beam along a light path from the light source means toward the receiver means;
   second optical system means for turning at least a portion of the first light beam in parallel with the light path; and
   third optical system means for allowing visual observance of both the light beam turned by the second optical system means and the receiver means, wherein the third optical system means comprises an image sensor for generating separate electronic data representative of both the image of light beam turned by the second optical system means and the image of the receiver means.

2. An optical atmospheric link system according to claim 1, wherein the transmitter means receives a second light beam from the receiver means and the third optical system means displays the relative positions of the first and second light beams, determines the position of the first light beam with respect to the second light beam and generates a corresponding control signal based on the determined result, and the transmitter means further comprises position control means for controlling the position of the transmitter means according to the control signal from the third optical system means so that the first light beam is directed toward the receiver means.

3. An optical atmospheric link system according to claim 1, wherein the second optical system means comprises half mirror means located between the first optical system means and the receiver means for passing a portion of the first light beam therethrough and for reflecting this light beam portion toward the third optical system means.

4. An optical atmospheric link system according to claim 3, wherein the second optical system means further comprises reflecting means, the image of the receiver means being reflected by the half mirror means and by the reflecting means to be guided toward the third optical system means.

5. An optical atmospheric link system according to claim 3, wherein the second optical system means further comprises reflecting means, the light beam reflected by the half mirror means being reflected by the reflecting means and passing through the half mirror means toward the third optical system means, the image of the receiver means being reflected by the half mirror means toward the third optical system means.

6. In an optical atmospheric link system for transmitting and receiving light beams carrying information signals between a transmitter and a receiver which are located apart from other, a transmitter comprising:
- light source means for generating a first light beam;
- optical system means for transmitting the first light beam toward the receiver;
- first detector means at the receiver for receiving the first light beam, detecting the position of the first light beam received relative to the receiver and for generating a corresponding position error signal;
- modulation means for modulating a second light beam from the receiver with the position error signal generated by the first detector means;
- second detector means for receiving the second light beam through the second optical system means and demodulating the second light beam to obtain the position error signal; and
- fine position control means for controlling the position of the transmitter means according to the position error signal obtained by the second detector means so that the first light beam is directed toward the receiver.

7. In an optical atmospheric link system for transmitting and receiving light beams carrying information signals between a transmitter means and a receiver means which is located apart from the transmitter means, the transmitter means comprising:
- light source means for generating a first light beam modulated with an information signal;
- first optical system means for transmitting the first light beam along a light path from the light source means toward the receiver means;
- second optical system means for turning at least a portion of the first light beam;
- third optical system means for allowing visual observance of both the light beam turned by the second optical system means and the receiver means, the third optical system means including an image sensor for generating electronic data representative of the images of both the light beam turned by the second optical system means and of the receiver means;
- wherein the transmitter means receives a second light beam from the receiver means and the third optical system means displays the relative positions of the first and second light beams, determines the position of the first light beam with respect to the second light beam and generates a corresponding control signal based on the determined result; and
- position control means for controlling the position of the transmitter means according to the control signal from the third optical system means so that the first light beam is directed toward the receiver means.

8. In an optical atmospheric link system for transmitting and receiving light beams carrying information signals between a transmitter means and a receiver means which is located apart from the transmitter means, the transmitter means comprising:
- light source means for generating a first light beam modulated with an information signal and wherein the transmitter means receives a second light beam from the receiver means;
- first optical system means for transmitting the first light beam along a light path from the light source means toward the receiver means;
- second optical system means for turning at least a portion of the first light beam;
- third optical system means for allowing visual observance of both the light beam turned by the second optical system means and the receiver means, and including an image sensor for generating video image data of both the light beam turned by the second optical system means and of the receiver means, and shutter means for alternately supplying the light beam turned by the second optical system means and the image of the receiver means to the image sensor, and wherein the third optical system means displays the relative positions of the first and second light beams, determines the position of the first light beam with respect to the second light beam and generates a corresponding control signal based on the determined result; and
- position control means for controlling the position of the transmitter means according to the control signal from the third optical system means so that the first light beam is directed toward the receiver means.

9. In an optical atmospheric link system for transmitting and receiving light beams carrying information signals between a transmitter means and a receiver means which is located apart from the transmitter means, the transmitter means comprising:
- light source means for generating a first light beam modulated with an information signal;
- first optical system means for transmitting the first light beam along a light path from the light source means toward the receiver means and including a lens having a focus position;
- second optical system means for turning at least a portion of the first layer beam; and
- third optical system means for allowing visual observance of both the light beam turned by the second optical system means and the receiver means and including an image sensor for generating image data of the light beam turned by the second optical system means, spot detecting means for detecting a spot width of the light beam according to the image data generated by the image sensor, and position control means for controlling the position of the light source means relative to the first optical system means to thereby position the light source means at the focus position of the lens of the first optical system means.

* * * * *